US012551400B2

(12) United States Patent
Ehrstedt et al.

(10) Patent No.: US 12,551,400 B2
(45) Date of Patent: Feb. 17, 2026

(54) MECHANICAL COMPRESSION DEVICE WITH ADJUSTABLE COMPRESSION POINT

(71) Applicant: Physio-Control, Inc., Redmond, WA (US)

(72) Inventors: Marcus Ehrstedt, Kävlinge (SE); Thomas Falk, Staffenstorp (SE); Anders Jeppsson, Lund (SE); Jonas Lagerstrom, Fagersanna (SE); Tyson Taylor, Bothell, WA (US); Robert G. Walker, Seattle, WA (US); Lars Anders Jörgen Segerstein, Staffanstorp (SE); Robert P. Marx, Jr., Kent, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 1068 days.

(21) Appl. No.: 17/510,266

(22) Filed: Oct. 25, 2021

(65) Prior Publication Data

US 2022/0125676 A1 Apr. 28, 2022

Related U.S. Application Data

(60) Provisional application No. 63/105,683, filed on Oct. 26, 2020.

(51) Int. Cl.
*A61H 31/00* (2006.01)

(52) U.S. Cl.
CPC ......... *A61H 31/007* (2013.01); *A61H 31/005* (2013.01); *A61H 2201/013* (2013.01);
(Continued)

(58) Field of Classification Search
CPC ..... A61H 31/00; A61H 31/005; A61H 31/007
See application file for complete search history.

(56) References Cited

U.S. PATENT DOCUMENTS

| | | | | |
|---|---|---|---|---|
| 5,257,619 A * | 11/1993 | Everete | A61H 31/007 601/41 |
| D461,008 S | 7/2002 | Hampf et al. | |

(Continued)

FOREIGN PATENT DOCUMENTS

| | | | |
|---|---|---|---|
| CN | 109223506 | 1/2019 | |
| WO | WO-2018010797 A1 * | 1/2018 | A61H 31/006 |

OTHER PUBLICATIONS

English translation of Xu (CN 109009981) (Year: 2018).*
(Continued)

*Primary Examiner* — Justine R Yu
*Assistant Examiner* — Christopher E Miller
(74) *Attorney, Agent, or Firm* — Miller Nash LLP

(57) ABSTRACT

Examples of the disclosure are directed to mechanical compression devices that can adjust a location of a compression position relative to a patient. One or more of the mechanical compression devices can adjust the compression position in an adjustment plane that is generally perpendicular to a patient. Some of the mechanical compression include support columns that have actuators that can be set asymmetrically to adjust the compression position and/or can be tilted relative to the backboard to adjust the compression position. Other examples includes mechanical compression devices that have multiple actuators that can be used to adjust the compression position as well as provide compressions.

20 Claims, 16 Drawing Sheets

(52) U.S. Cl.
CPC ................ *A61H 2201/0196* (2013.01); *A61H 2201/1623* (2013.01); *A61H 2201/1664* (2013.01); *A61H 2201/5007* (2013.01); *A61H 2201/5064* (2013.01)

(56) References Cited

U.S. PATENT DOCUMENTS

| | | | | |
|---|---|---|---|---|
| 9,539,173 | B2 | 1/2017 | Jeppsson | |
| 9,603,772 | B2 | 3/2017 | Jeppsson | |
| 9,775,771 | B2 | 10/2017 | Stemple et al. | |
| 10,702,449 | B2 | 7/2020 | Chapman et al. | |
| 2010/0004572 | A1* | 1/2010 | King | A61H 31/008 601/41 |
| 2010/0185127 | A1* | 7/2010 | Nilsson | A61H 31/00 601/41 |
| 2010/0198118 | A1* | 8/2010 | Itnati | A61H 31/006 601/41 |
| 2013/0176158 | A1 | 7/2013 | Kim et al. | |
| 2013/0324894 | A1 | 12/2013 | Herken et al. | |
| 2014/0171840 | A1* | 6/2014 | Aelen | A61H 31/006 601/41 |
| 2014/0180180 | A1* | 6/2014 | Nilsson | A61H 31/006 601/41 |
| 2014/0221882 | A1* | 8/2014 | Jeppsson | A61H 31/006 601/41 |
| 2014/0221883 | A1* | 8/2014 | Jeppsson | A61H 31/006 601/41 |
| 2015/0119768 | A1* | 4/2015 | Meier | A61H 31/006 601/41 |
| 2015/0352002 | A1* | 12/2015 | Jeppsson | A61H 31/005 601/41 |
| 2016/0296419 | A1* | 10/2016 | Paulussen | A61H 31/006 |
| 2017/0156979 | A1* | 6/2017 | Walden | A61H 31/008 |
| 2017/0172845 | A1 | 6/2017 | Walden et al. | |
| 2019/0021943 | A1 | 1/2019 | Nilsson et al. | |
| 2019/0029920 | A1* | 1/2019 | Kostic | A61G 1/048 |
| 2019/0209428 | A1* | 7/2019 | Paradis | A61B 5/026 |
| 2022/0117839 | A1 | 4/2022 | Jeppsson et al. | |
| 2022/0125676 | A1 | 4/2022 | Ehrstedt et al. | |
| 2024/0374472 | A1 | 11/2024 | Ehrstedt et al. | |

OTHER PUBLICATIONS

English translation of Hua (CN 109350490) (Year: 2019).*
CN 109223506 A Specification Machine Translation (Year: 2025).
Qvigstad et al., "Clinical pilot study of different hand positions during manual chest compressions monitored with capnography," Resuscitation, vol. 84, No. 9, 2013, pp. 1203-1207.

* cited by examiner

MECHANICAL COMPRESSION DEVICE WITH ADJUSTABLE COMPRESSION POINT

CROSS-REFERENCES TO RELATED APPLICATIONS

This patent application claims the benefit of U.S. provisional patent application No. 63/105,683 filed Oct. 26, 2020, which is incorporated into the present disclosure by this reference.

TECHNICAL FIELD

This disclosure is directed to systems and methods related to mechanical cardiopulmonary resuscitation (CPR) devices, and in particular, to compression devices have an adjustable compression point.

BACKGROUND

Mechanical compression devices for CPR are being increasingly adopted by emergency medical services around the world. Traditionally, CPR has been performed manually by a rescuer. However, during longer duration resuscitations, a rescuer can become fatigued and provide inadequate compressions. Mechanical compression devices have been adopted by many emergency medical services to address these potential drawbacks of manual CPR by a rescuer.

Conventional mechanical CPR devices repeat the same compression at the same location on a patient's chest repeatedly. This precise consistency is non-physiological and there may be benefits to moving or adjusting the location of the chest compression either before CPR begins or during CPR.

Configurations of the disclosed technology address shortcomings in the prior art.

BRIEF DESCRIPTION OF THE DRAWINGS

Aspects, features and advantages of examples of the present disclosure will become apparent from the following description of examples in reference to the appended drawings in which.

DETAILED DESCRIPTION

Examples of the disclosure are directed to mechanical compression devices that can adjust the compression point or compression location on a chest of a patient, either manually or automatically. In some examples, the compression point may be changed during CPR based on feedback from physiological sensors attached or connected to a patient or feedback from patient positioning sensors.

Figure 1:
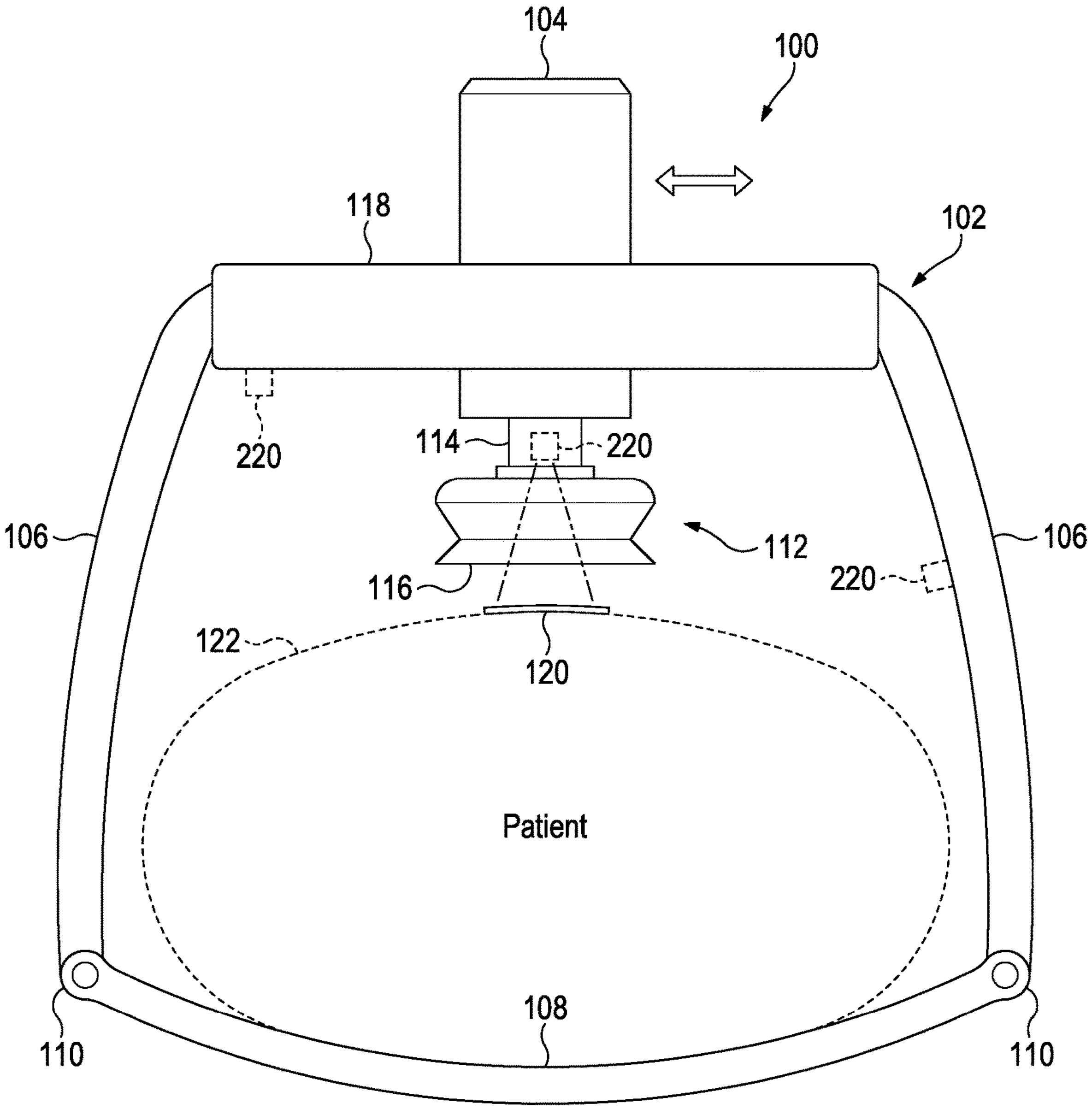
FIG. 1 is a front view of a mechanical compression device with an adjustment mechanism to adjust a compression position according to some examples of the disclosure.

FIG. 1 is a front view of an example mechanical CPR device 100 that can compress and/or expand a chest and/or abdomen of a patient. As will be understood by one skilled in the art, the mechanical CPR device 100 may include additional components not shown in FIG. 1.

As illustrated in FIG. 1, a CPR device 100 may include a support structure 102 and a central unit 104. The support structure 102 may include support legs 106 and a base member 108. The support legs 106 and the base member 108 meet at a junction 110 between each support leg 106 and the base member 108.

The support legs 106 may be configured to support central unit 104 at a distance from the base member 108. For example, if the base member 108 is underneath the patient, who is lying on the patient's back, then the support legs 106 may support the central unit 104 at a sufficient distance over the base member 108 to allow the patient to lay within a space between the base member 108 and the central unit 104, while positioning a compression mechanism 112 over the patient's chest or abdomen. The base member 108 may be configured to be placed underneath the patient, for example when the patient is lying on the patient's back.

The central unit 104 may be configured to deliver CPR compressions to the patient. The central unit 104 may include, for example, a compression mechanism 112 that has a motor-driven piston 114 configured to contact the patient's chest through a suction cup 116 or other interface to provide CPR compressions. The central unit 104 may also include a number of electronic components to drive the motor-driven piston 114. In the example illustrated in FIG. 1, attached to the motor-driven piston 114 is a suction cup 116 that adheres to the chest of the patient during chest compressions. The suction cup 116 can allow the motor-driven piston 116 to lift the chest back to a resting height, or provide a full decompression of the chest of the patient, when the motor-driven piston 116 is retracted from an extended position.

The central unit 104 also may include an adjustment mechanism 118 surrounding the compression mechanism 112. The adjustment mechanism 118 may be, for example, a rectangular shape and be structured to adjust the compression mechanism 112 and the resulting compression point in any location within the adjustment mechanism 118. That is, the adjustment mechanism 118 may adjust the compression position in an adjustment plane that is generally parallel to the patient.

Figure 2:
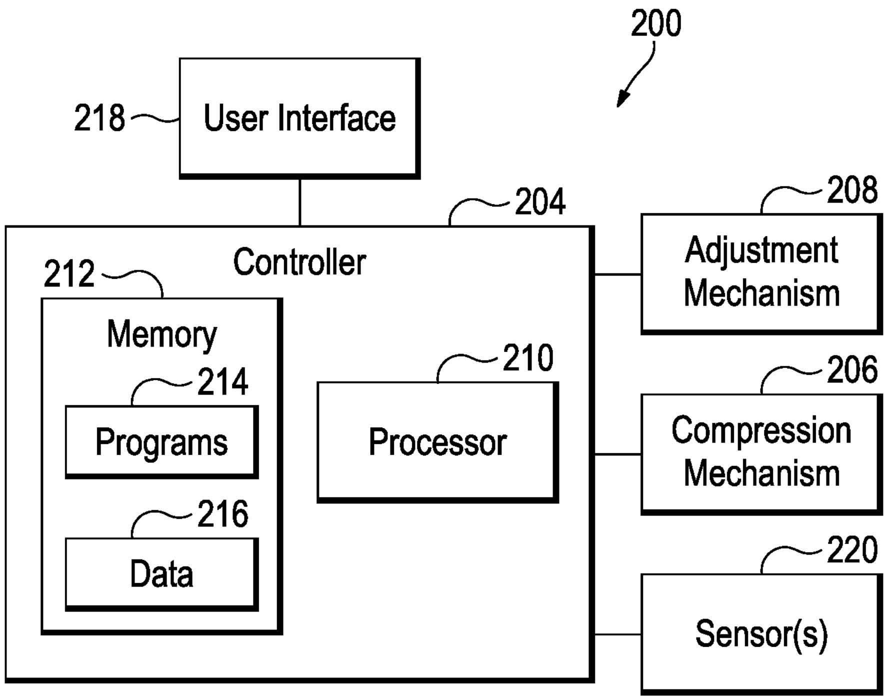
FIG. 2 is a schematic block diagram of a mechanical compression device according to examples of the disclosure.

FIG. 2 illustrates an example schematic block diagram of a mechanical compression device 200. The components of the mechanical compression device 200 may be used with any of the mechanical compression devices discussed herein. As will be understood by one skilled in the art, the mechanical compression device 200 may include additional components not shown in FIG. 2. The mechanical compression device 200 includes a controller 204, which may be in electrical communication with a compression mechanism 206 and an adjustment mechanism 208. The adjustment mechanism 208 is any adjustment mechanism used to adjust the compression position of the mechanical compression device, such as the adjustment mechanism 118 discussed above or any of the adjustment mechanisms discussed below.

The controller 204, as will be discussed in more detail below, provides instructions to the compression mechanism 206 to operate the compression mechanism 206 at a number of different rates, waveforms, depths, heights, duty cycles or combinations thereof that change over time. Example chest and/or abdomen manipulation instructions or protocols include compressing a chest and/or abdomen and decompressing and/or expanding of a chest and/or abdomen of a patient. The controller 204, as will also be discussed in more detail below, also provides instructions to the adjustment mechanism 208 to position the suction cup 116 or any other interface at a particular or desired compression position.

The controller 204 may include a processor 210, which may be implemented as any processing circuity, such as, but not limited to, a microprocessor, an application specific integration circuit (ASIC), programmable logic circuits, etc. The controller 204 may further include a memory 212 coupled with the processor 210. Memory 212 can include a non-transitory storage medium that includes programs 214 configured to be read by the processor 208 and be executed upon reading. The processor 208 is configured to execute instructions from memory 212 and may perform any methods and/or associated operations indicated by such instructions. Memory 212 may be implemented as processor cache, random access memory (RAM), read only memory (ROM), solid state memory, hard disk drive(s), and/or any other memory type. Memory 212 acts as a medium for storing data 216, such as instructions for the adjustment mechanism 208 or compression mechanism 206, event data, patient data, etc., computer program products, and other instructions.

The controller 204 may be located separately from the compression mechanism 206 and/or adjustment mechanism 208 and may communicate with the compression mechanism 206 and/or adjustment mechanism 208 through a wired or wireless connection. The controller 204 also electrically communicates with a user interface 218. As will be understood by one skilled in the art, the controller 204 may also be in electronic communication with a variety of other devices, such as, but not limited to, a communication device, another medical device, etc.

Operations of the mechanical compression device 200 may be effectuated through the user interface 218 in some examples. The user interface 218 may be external to or integrated with a display. For example, in some examples, the user interface 218 may include physical buttons located on the mechanical compression device 200, while in other examples, the user interface 218 may be a touch-sensitive feature of a display. The user interface 218 may be located on the mechanical compression device 200, or may be located on a remote device, such as a smartphone, tablet, PDA, and the like, and is also in electronic communication with the controller 204. In some examples, controller 204 can receive a rate, a waveform, and/or depth input from the user interface 218 and, responsive to the rate, the waveform, and/or depth input, cause the compression mechanism 206 to move to adjust the rate, waveform, and/or depth of the compression, decompression, or expansions during a session.

Additionally or alternatively, one or more sensors 220 may transmit information to controller 104. The one or more sensors 220 may be, for example, physiological sensors for sensing a physiological parameter of a patient and to output a physiological parameter sensor signal that is indicative of a dynamic value of the parameter. The physiological parameter can be an Arterial Systolic Blood Pressure (ABSP), a blood oxygen saturation (SpO2) or plethysmograph, a ventilation measured as End-Tidal CO2 (ETCO2) or capnography waveform, invasive blood pressure data, a temperature, a detected pulse, inspired oxygen (O2), air flow volume, blood flow, etc. In addition, this parameter can be detected by defibrillator electrodes that may be attached to patient, such as electrocardiogram (ECG) and transthoracic impedance, and transmitted to the controller 204. The one or more sensors 220 may also include patient positioning sensors that are configured to detect the position of the patient, such as, but not limited to a chest height or a centerline of a patient. With reference to FIG. 1, in configurations a reference 120 may be placed on the patient's 122 chest to aid the one or more sensors 220 with detecting the position of the patient. The reference 120 may be, for example, one or more target marks, lights, or RFID (radio frequency identification) tags. The one or more sensors 220 may include, for example, a camera or RFID reader. In configurations, target marks may be projected onto the patient's chest by a light source. The one or more sensors 220 may be, for example, on the central unit 104, on the support legs 106, on the compression mechanism 112, or another suitable location.

Returning to FIG. 2, based on the information from the one or more sensors 220, the controller 204 can adjust a compression position by the adjustment mechanism 208. For example, based on the ETCO2 reading or a blood flow reading, the controller 204 may determine that the compression position needs to be adjusted to be more directly over a center of a patient's chest and may instruct the adjustment mechanism 208 to move the compression position in the adjustment plane. In other examples, the controller 204 may output an alert to the user interface 210 for a rescuer to manually adjust the compression position by the adjustment mechanism 208.

If the sensors 220 are patient positioning sensors, the controller 204 can adjust the compression position by the adjustment mechanism 208 based on the feedback from the patient positioning sensors, which may be able to detect, for example, a chest height of a patient, as well as a centerline of the chest of the patient.

If the sensors 220 are visual sensors, the controller 204 can adjust the compression position by the adjustment mechanism 208 based on feedback from the visual sensors, which may include image analysis to optimize the location of the compression position relative to the patient's thorax. If the sensors 220 are RFID sensors, the controller 204 can adjust the compression position by the adjustment mechanism 208 based on feedback from the RFID tag.

In some examples, the controller 204 may continually adjust the compression point based on the information transmitted by the one or more sensors 220 to ensure that an optimal compression point is achieved. In other examples, the controller 204 may adjust the compression point by the adjustment mechanism 208 incrementally to determine which direction of movement of the compression point results in an improvement of the physiological signals from the patient.

Figure 3:
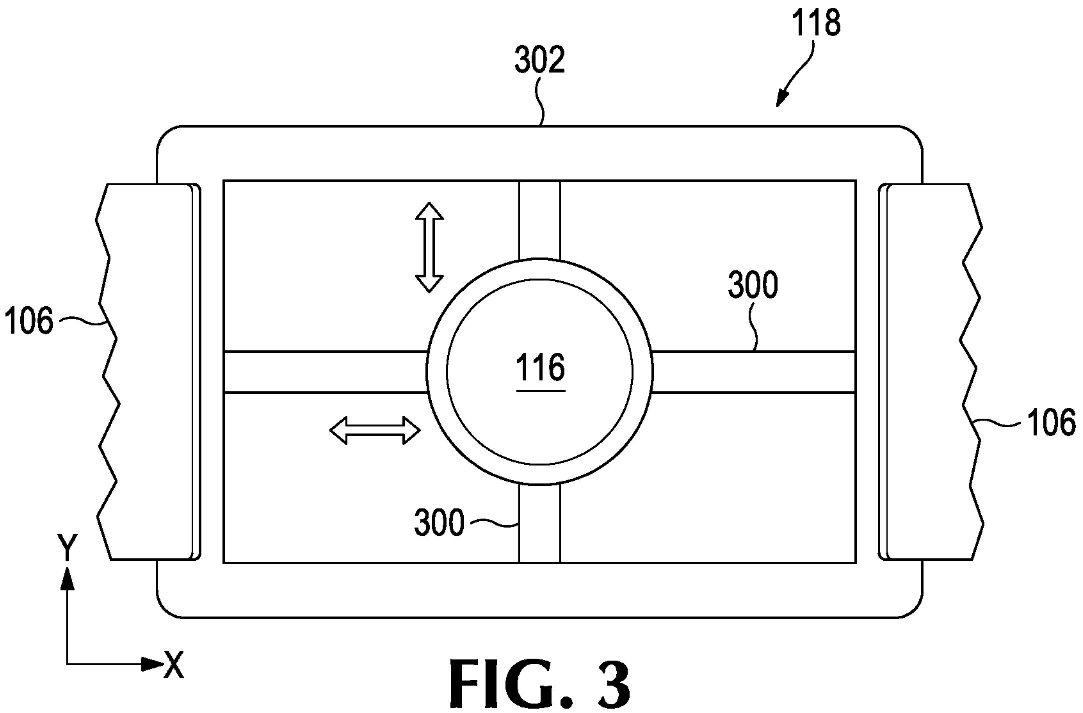
FIGS. 3 and 4 are bottom views of the adjustment mechanism of the mechanical compression device of FIG. 1.
Figure 4:
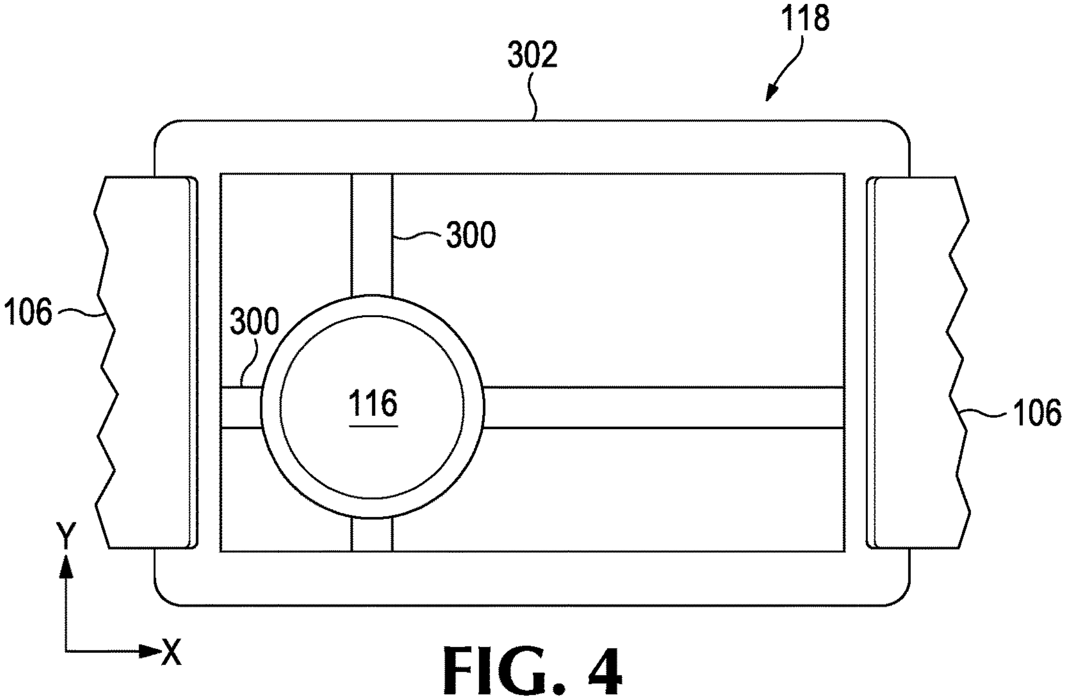

FIGS. 3 and 4 illustrate a bottom view of the adjustment mechanism 118 of FIG. 1. A number of guide rods 300 are provided and are attached to the motor-driven piston 116. The guide rods 300 can be adjusted in both the x-axis direction and the y-axis direction to place the suction cup 116 at a desired location on the patient.

The exterior edges 302 of the adjustment mechanism 118 may include a slot or other mechanism to allow the guide rods 300 to move along the x-axis and y-axis. For example, the guide rods 300 may be manually movable within the slot and include a stopper or other locking mechanism, such as a clamp, to position the suction cup 116 in the desired location. In some examples, the guide rods 300 may be movable along rails in the exterior edges 302 of the adjustment mechanism 118 or may be attached to linear actuators.

In other examples, the guide rods 300 are automatically movable by a controller 204 of the mechanical compression device. The guide rods 300 may be linear actuators and the exterior edges 302 of the adjustment mechanism may also include linear actuators. In concert, the linear actuators can position the suction cup 116 in a desired location based on an input received as user interface 210. Drivers (not shown) may be attached to the linear actuators which are driven based on instructions received from the controller 204. The linear actuators may be any known linear actuators, such as, but not limited to, hydraulic, electrical, pneumatic, magnetic, etc.

FIG. 3 illustrates a situation where the suction cup 116 is positioned at the center of the adjustment mechanism 112. FIG. 4, alternatively, illustrates when the position of the suction cup has moved along both the x-axis and the y-axis to a position in the lower corner of the adjustment plane. As mentioned above, a rescuer may manually adjust the position of the compression point based on either the location of the body of the patient or an output from the mechanical compression device 200. For example, the output from the mechanical compression device 200 may communicate the location of the compression point to the rescuer through the user interface 218. In other examples, the adjustment mechanism 118 drivers may drive the adjustment mechanism 118 to a desired compression point based on an input from a user indicating the compression position at the user interface 218 or based on information transmitted from one or more sensors 220.

Figure 5:
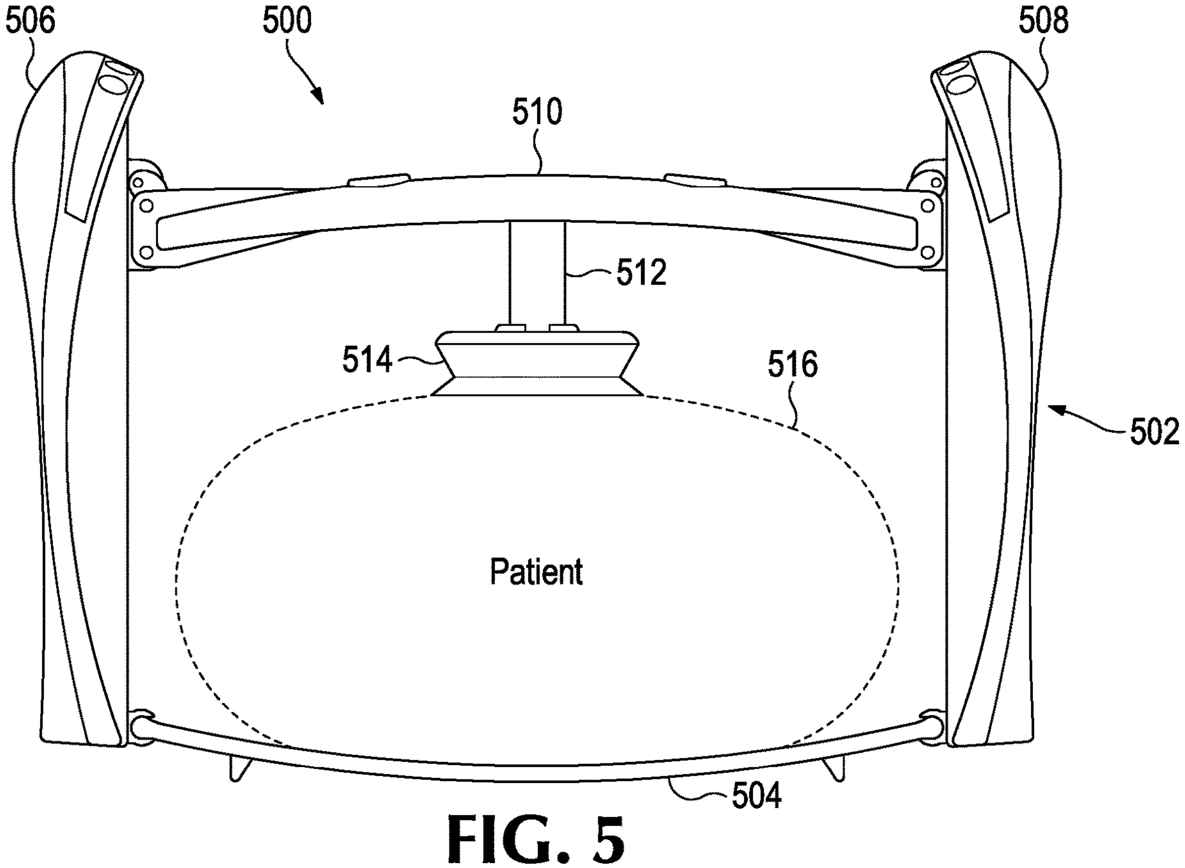
FIG. 5 is a front view of another mechanical compression device for adjusting a compression position according to some examples of the disclosure.

FIG. 5 illustrates another example mechanical compression device 500 that can adjust a compression position according to some examples of the disclosure. The mechanical compression device 500 may include the electrical components discussed above with respect to FIG. 2.

The mechanical compression device 500 can include a support frame 502 and a back plate 504. The support frame 502 includes two support columns 506 and 508 that support a compression beam 510 at a distance from the back plate 504. The compression beam 510 includes an attachment 512 for a suction cup 514 to attach to a chest of a patient 516 during mechanical compression and/or decompressions or expansions. Although a suction cup 514 is illustrated in FIG. 5, other interfaces for the compression beam 510 may be used instead, such as a compression pad, rather than a suction cup.

Figure 7:
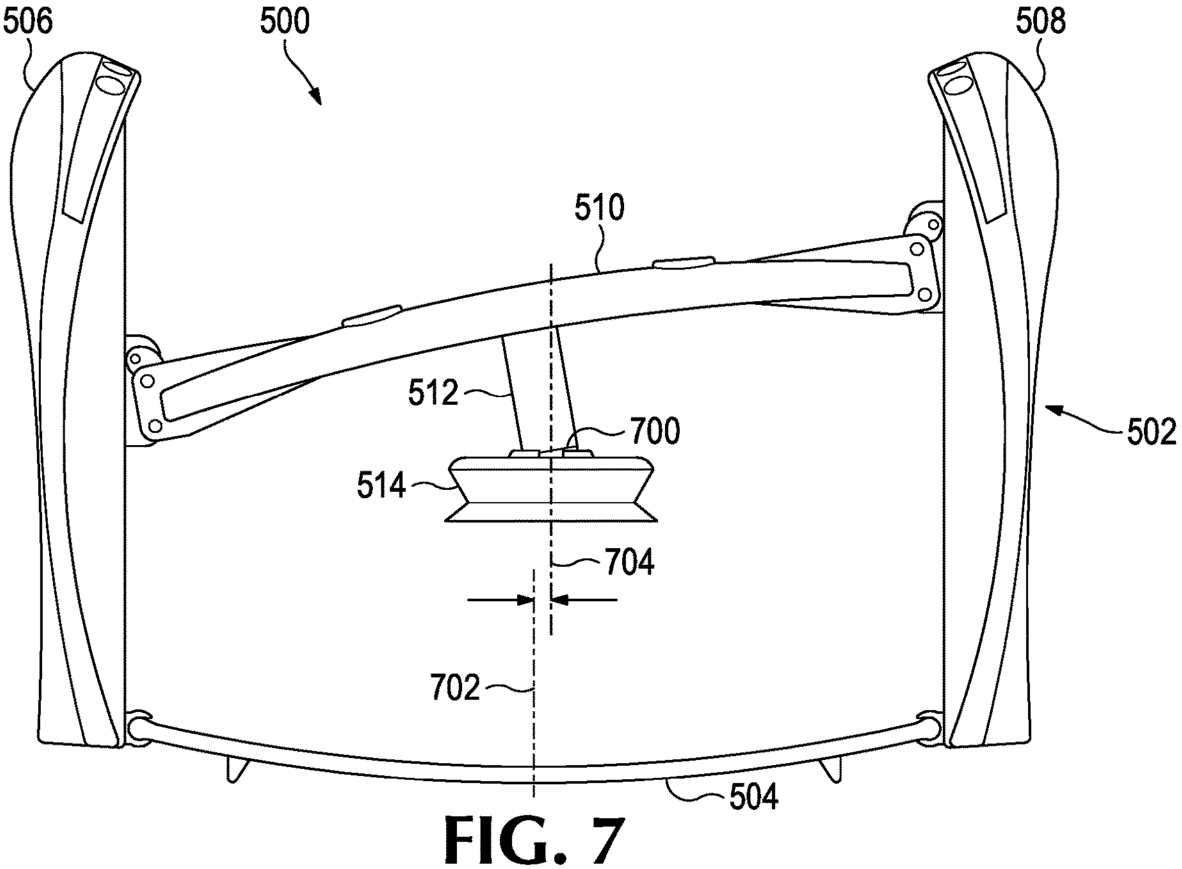
FIG. 7 is another front view of the mechanical compression device of FIG. 5 illustrating asymmetrical starting positions of the actuators according to some examples of the disclosure.

The compression beam 510 can be attached to actuators located along or inside the support columns 506 and 508. The actuators may be any known actuators, such as, but not limited to, hydraulic, electrical, pneumatic, magnetic, etc. The actuators are structured to translate the compression beam 510 vertically with respect to the back plate 504 from a starting position during compressions. The actuators are driven by the controller 204 and can be driven independently or in concert. The actuators are driven by the controller 204 from a starting position to a compression position and then back up to the starting position. A rescuer may adjust the start position of the compression beam 510 either manually or through the user interface 210. The start position of each of the actuators in the support columns 506 and 508 may either be symmetrical, as illustrated in FIG. 5, or asymmetrical, as illustrated in FIG. 7 discussed below. The controller 204 and other electrical components may be located at the top of either or both of the support columns 506 and 508. In some examples, the electrical components and controller 204 may be located in the compression beam 510. Examples of the disclosure, however, are not limited to the electrical components, such as controller 204, being located in these locations and may be located anywhere within the mechanical compression device 500, such as in the back plate 504 or any other location.

Figure 6:
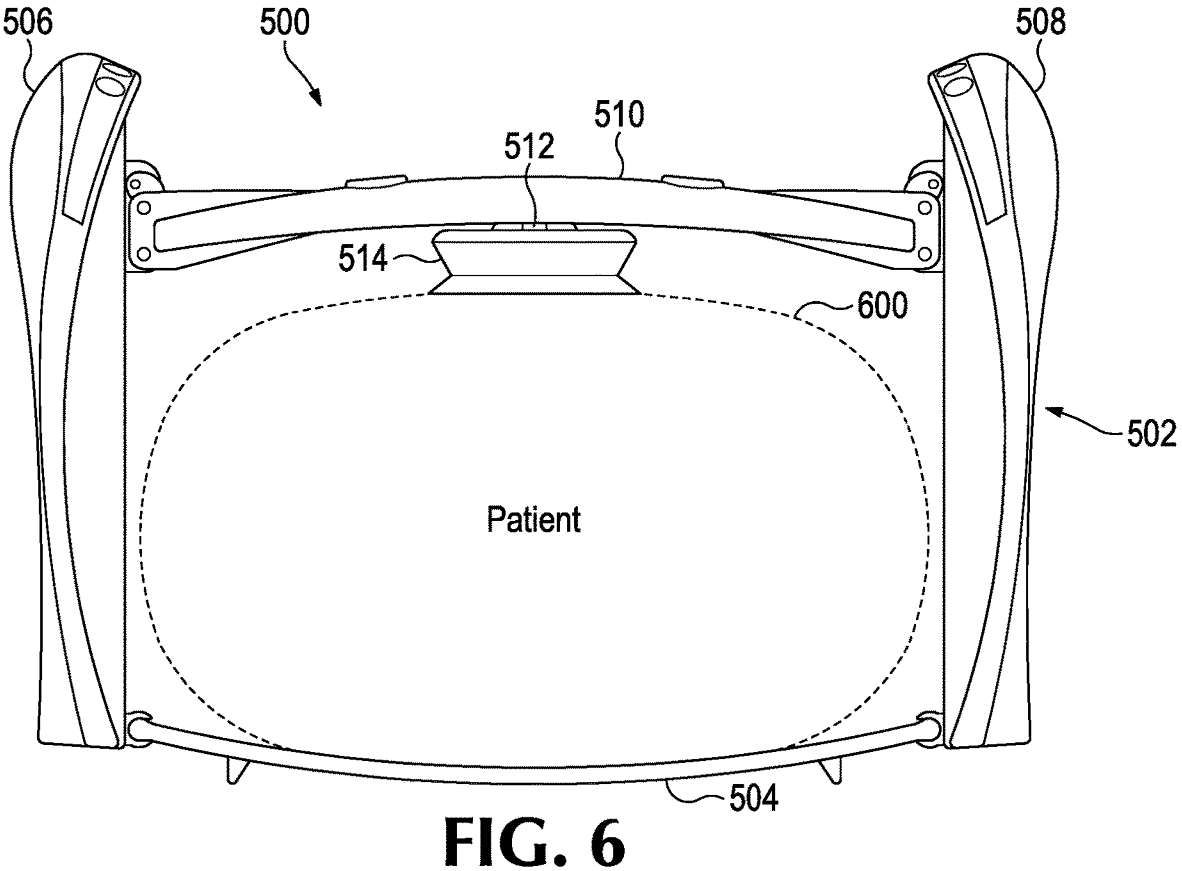
FIG. 6 is another front view of the mechanical compression device of FIG. 5.

FIG. 6 illustrates an additional or alternative example of the mechanical compression device 500 when the attachment 512 of the compression beam 510 is collapsed to accommodate a larger patient 600. The attachment 512 may be telescoping or otherwise have a variable distance to accommodate patients of different sizes in some examples. A rescuer may set and lock the attachment 512 at a desired position so that the suction cup 514, or other interface, is abutting the chest of the patient. For smaller patients, the starting point of the compression beam 510 may also be set at a lower position on the actuators to accommodate patients with a smaller chest height.

The length of the attachment 512 may be set either manually by a user or may include an actuator or other electrical component which can set the distance of the attachment 512 to the desired height. The suction cup 514, or other interface, may include a sensor 220 which transmits information to the controller 204 to determine when the suction cup 514 has attached to the chest of the patient and what length to set the attachment 512.

A lateral position of the compression point on the patient may be adjusted, as illustrated in FIG. 7. Additionally or alternatively, the attachment 512 may include a joint 700 to attach to the interface, which is illustrated in FIG. 7 as a suction cup 514. The joint 700 can allow the interface, or suction cup 514, to adapt correctly to a patient. Other mechanisms to allow for adaptations to a patient's chest may also be used in some examples.

The starting point of each of the actuators in the support columns 506 and 508 may be set independently so the starting positions are asymmetrical. This can allow the compression position on the chest of the patient to be adjusted laterally, or side-to-side, with respect to a centerline 702 of the mechanical compression device 500, as illustrated in FIG. 7. In FIG. 7, the compression position has been moved to the right of the centerline 702. That is, a centerline 704 of the suction cup 514 is to the right of the centerline 702 of the mechanical compression device 500. However, although FIG. 7 illustrates the suction cup 514 to the right of the centerline 702, the compression position may also be set to the left of the centerline 702 as will be understood by one skilled in the art.

During compressions, the controller 204 can drive the actuators of the support columns 506 and 508 from their starting positions to compress a chest of a patient, and then back up to the starting position while maintaining the laterally adjusted compression point. As mentioned above, the starting positions of the actuators may be set manually or may be set automatically by the controller 204. Additionally or alternatively, in some examples, the controller 204 can adjust the starting position during a chest compression session of one or both of the actuators to laterally adjust the position of the compression point. The adjustment may be done based on feedback from either a user interface 218 or from one or more sensors 220 connected to the patient.

Figure 8:
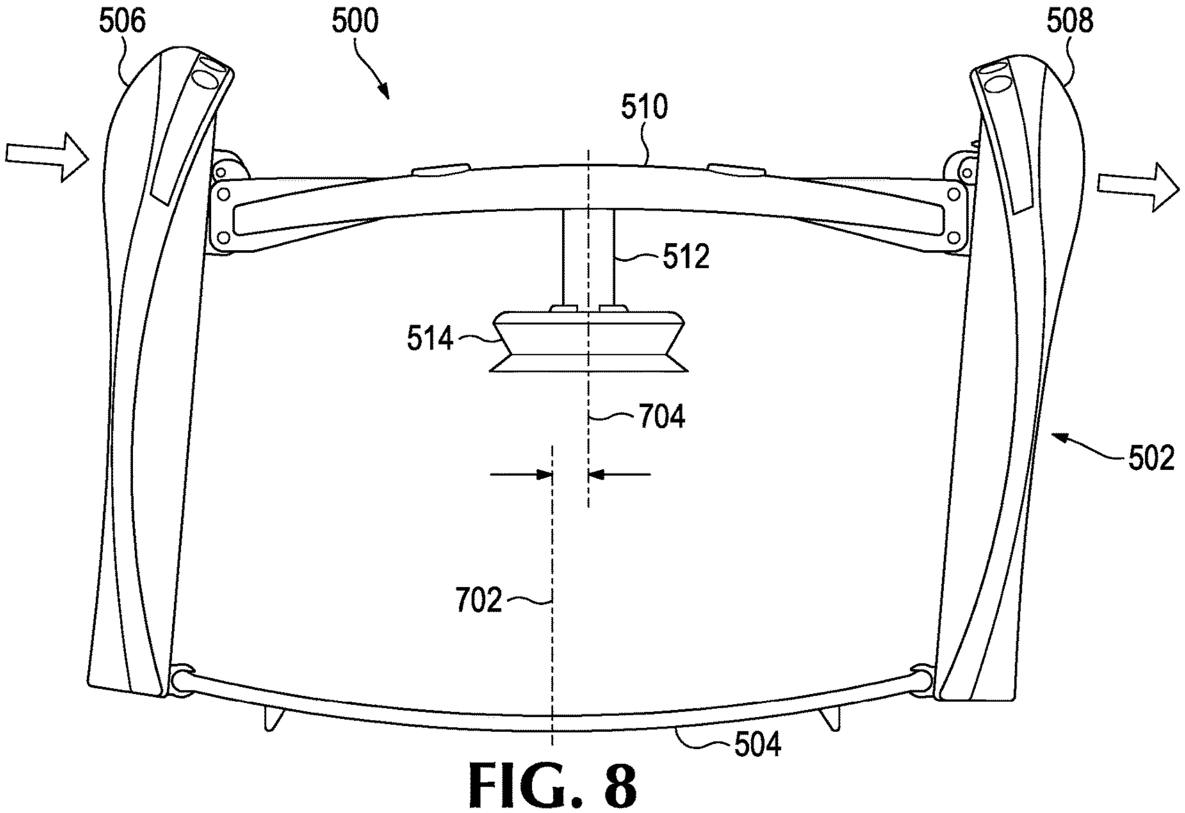
FIG. 8 is another front view of the mechanical compression device of FIG. 5 illustrating a tilt of support columns according to some examples of the disclosure.

Additionally or alternatively, as illustrated in FIG. 8, the support columns 506 and 508 can tilt relative to the back plate 504 to adjust a compression position. While FIG. 8 shows the support columns 506 and 508 tilting laterally with respect to the back plate 504, for ease of illustration, examples of the disclosure are not limited to only a side-to-side tilt of the support columns 506 and 508. Rather, the support columns 506 and 508 may also tilt toward a patient's head or feet, such as along a plane that is parallel to the centerline 702.

The support columns 506 and 508 can tilt relative to the back plate 504 either manually or be driven by the controller 204. Once in the desired tilt position, the support columns 506 and 508 are locked and made rigid in the tilted position, such as by clamping or otherwise providing a stop to prevent the support columns 506 and 508 from tilting further in either direction during operation of the mechanical compression device 500.

Additionally or alternatively, as will be understood by one skilled in the art, the support columns 506 and 508 may have adjustable independent starting positions, as well as be able to tilt relative to the back plate 504, either perpendicularly or parallel to the centerline 702 to provide numerous options for adjusting a compression position. Further, such tiling and adjusting the start of the compression positions can allow the mechanical compression device 500 to provide compressions at an angle relative to the chest of the patient, which may be beneficial in some rescue situations. Chest compressions using conventional mechanical compression devices are generally performed substantially perpendicular, or 90 degrees, relative to the patient. However, tiling and adjusting the starting position of the compression positions to be asymmetrical can allow the mechanical compression device 500 to provide compressions with a force angle other than 90 degrees relative to the patient. That is, the force angle of the compression may between 10 and 170 degrees relative to the chest or abdomen of the patient, either laterally or medially.

Additionally or alternatively to each of the above-discussed examples, in some examples, the compression beam 510 may pivot or tilt relative to the support columns 506 and 508. That is, the compression beam 510 may pivotably or rotatably attach to the actuators in the support columns 506 and 508 to provide compressions at an angle. For example, the compression beam 510 may attached to the actuators by a hinge that can allow the compression beam 510 to pivot and be locked in a pivoted or rotates position for performing compressions at an angle. The compression beam 510 may pivot or rotate about an axis that is parallel to an axis extending between the two support columns 506 and 508. In some examples, the compression beam 510 pivot angle can be set manually or may be set by the controller 204 based either one user input or feedback from one or more sensors 220.

Additionally or alternatively to each of the above-discussed examples, in some examples, one or both of the support columns 506 and 508 may bend.

Figure 9:
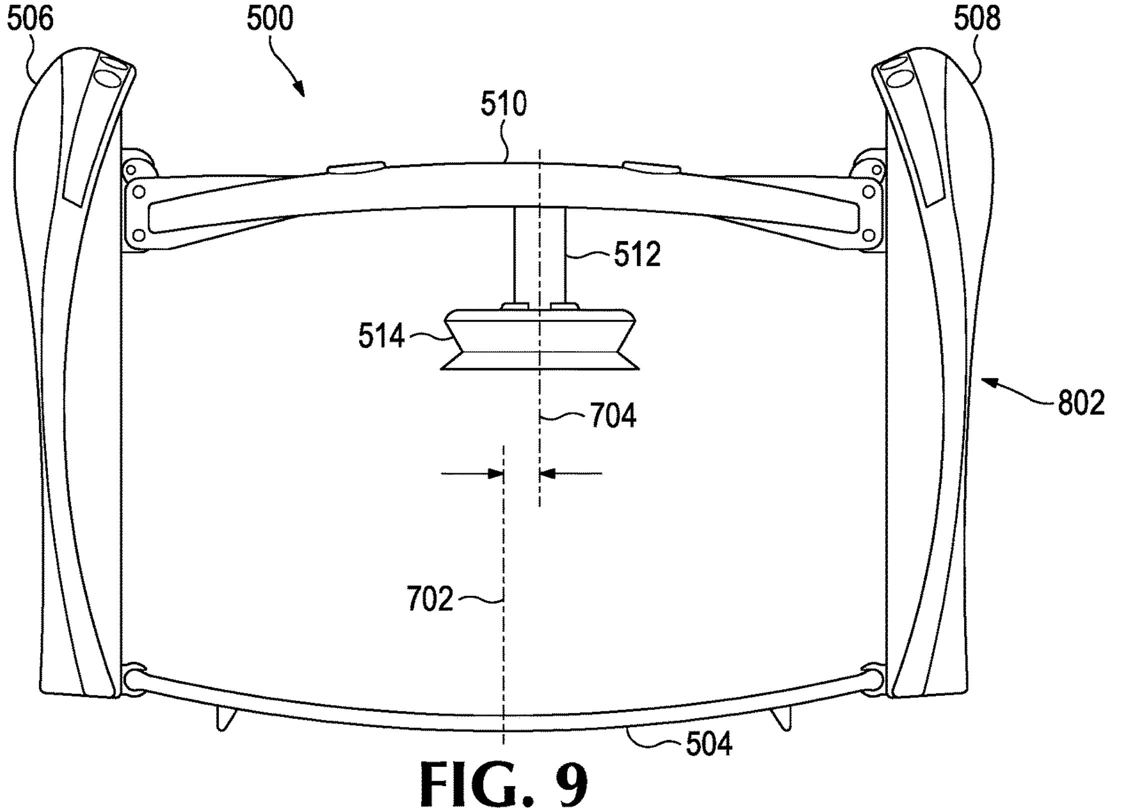
FIG. 9 is another front view of the mechanical compression device of FIG. 5 illustrating laterally adjusting a compression position according to some examples of the disclosure.
Figure 10:
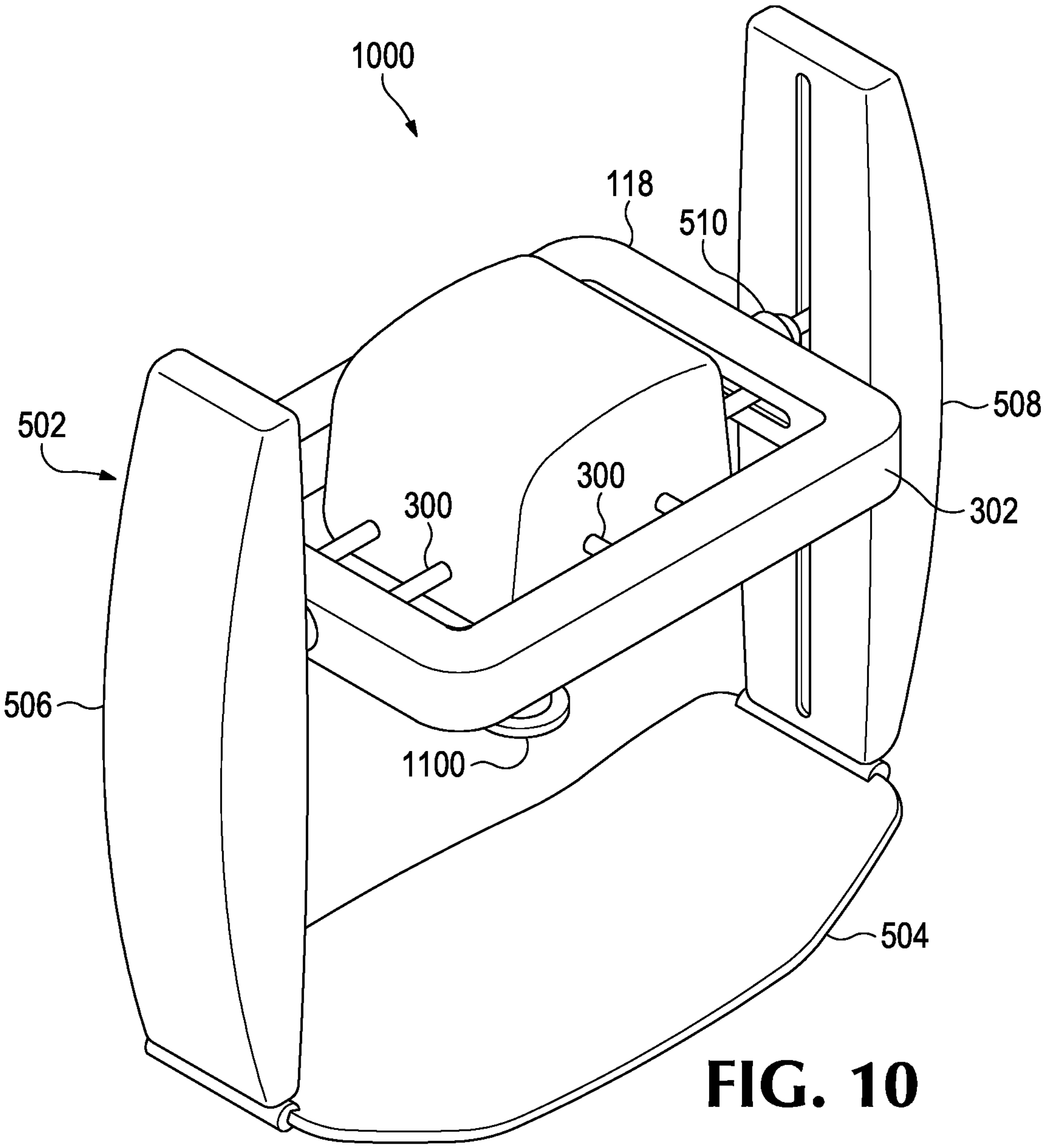
FIG. 10 is a perspective view of another example of a mechanical compression device for adjusting a compression position according to some examples of the disclosure.

Additionally or alternatively to each of the above-discussed examples, in some examples the attachment 512 may move relative to the compression beam 510, as illustrated in FIG. 9. That is, the attachment 512 may move laterally to adjust the compression point either to left or the right of the centerline 702 of the mechanical compression device 500. This may be done in combination with independently adjusting the starting positions of the actuators and/or tilting the legs relative to the back plate 504 in some examples. In some examples, as illustrated in FIG. 10, the compression beam 510 may include the adjustment mechanism 118 of FIG. 1. Any or all of the above-discussed features of the mechanical compression device 500 may be included in the mechanical compression device 1000 with the included adjustment mechanism 118 of FIG. 1.

Figure 11:
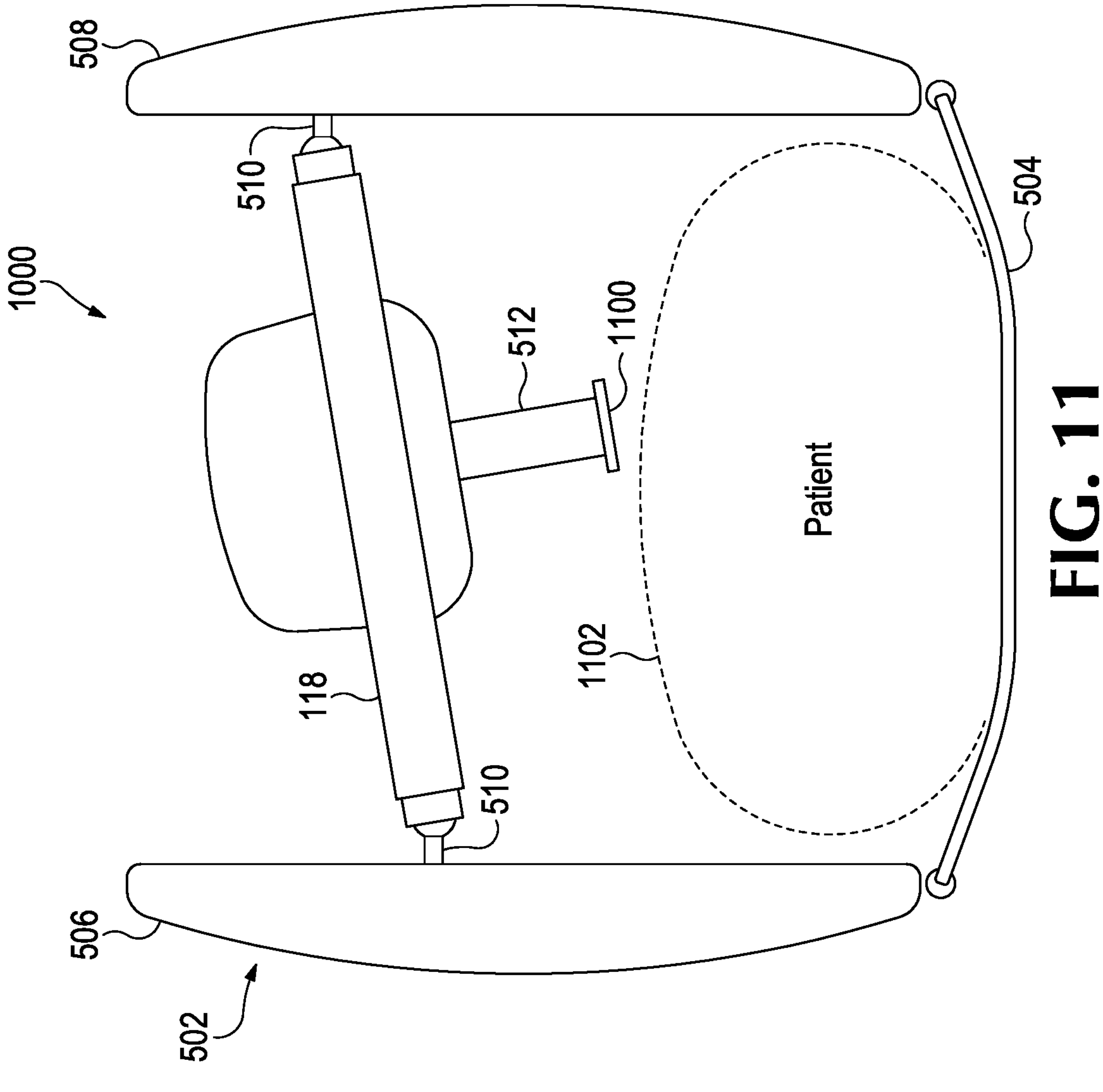
FIG. 11 is a front view of the mechanical compression device of FIG. 10.

For example, the starting position of both the actuators in the support columns 506 and 508 may be set independently and may be symmetrical or asymmetrical, as shown, for example in FIG. 11. In FIG. 11, the attachment 512 includes an interface 1100. In some examples, the interface 1100 may be a suction cup, for example, or any other type of compression interface. The position of the interface 1100 can be adjusted by adjusting the position using the adjustment mechanism 118, as well as set the starting position of the actuators in the support columns 506 and 508 to be asymmetrical. The controller 204 can then control the actuators in the support columns 506 and 508 to perform the compressions. The adjustment mechanism 118 and the starting point of the actuators in the support columns 506 and 508 may be set manually or automatically by the controller 204, as discussed in detail above. As can be seen in the examples illustrated in FIG. 10, the compression position is not perpendicular to the patient 1102, but rather is angled at approximately 70 degrees relative to the patient 1102.

Additionally or alternatively, the support columns 506 and 508 may tilt relative to the back plate 504, in some examples. This can provide a number of different options for changing the compression position as well as providing compressions. As one example, with the support columns 506 and 508 titled, as well as the compression point adjusted by the adjustment mechanism 118, the mechanical compression device 1000 may provide compressions at an angle relative to the compression point set by the adjustment mechanism 118.

The mechanical compression device 1000 can include the controller 204 and other components discussed above with respect to FIG. 2. That is, the controller 204 can control both the adjustment mechanism 118, as well as the tiling of the support columns 506 and 508 and the actuators in the support columns 506 and 508 for performing the compressions. The controller 204 can modify the compression position during operation of the mechanical compression device 1000 based on an input from the user interface 218 or feedback from the one or more sensors 220, as discussed above.

Figure 12:
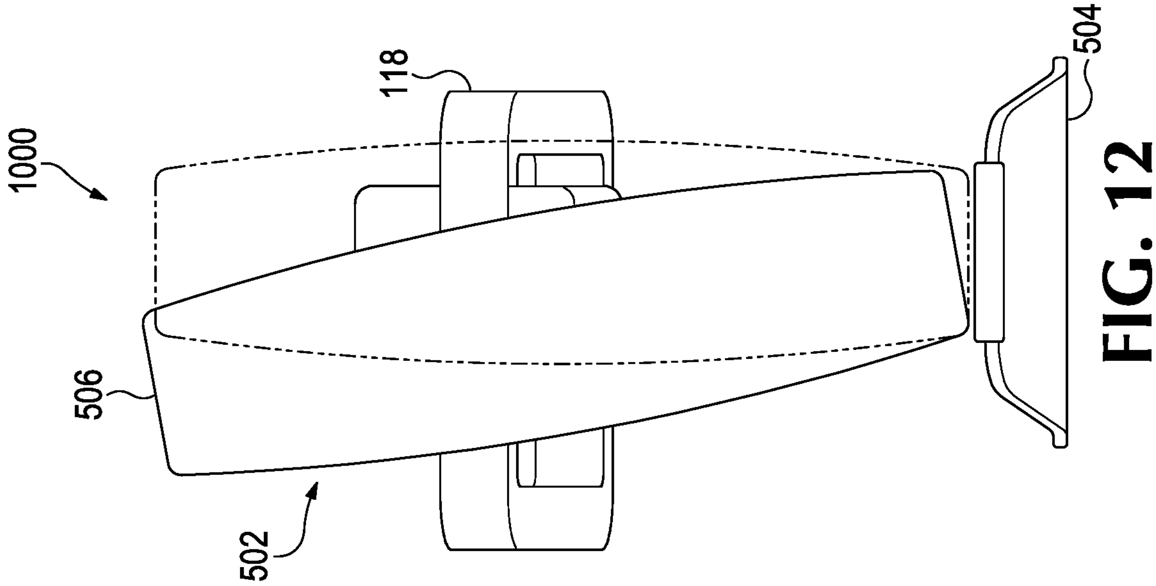
FIG. 12 is a side view of the mechanical compression device of FIG. 10 according to some examples of the disclosure.

FIG. 12 illustrates a side view of the mechanical compression device 1000 that illustrates the support columns 506 and 508 tilting along an axis that extends between the support columns 506 and 508. The support columns 506 and 508 may attach by a hinge, for example, to the base plate 504 which can allow the support columns 506 and 508 to tilt toward a patient's head or feet to change or adjust an angle of force of a compression. The angle or title of the support columns 506 and 508 may be adjusted either manually or by the controller 504. While the tilting of the support columns 506 and 508 are shown with the adjustment mechanism, the support columns 506 and 508 discussed above with respect to FIGS. 5-9 can also tilt in this same manner.

Additionally or alternatively, the compression beam 510 with the adjustment mechanism 118 may also rotate relative to the support columns 506 and 508 in some examples, as discussed above with respect the compression device 500. The support beam 510 may rotate about an axis that extends between the support columns 506 and 508 to change an angle of the compression provided to the patient. The support beam 510 may be manually adjusted or adjusted automatically by the controller 204.

Figure 13:
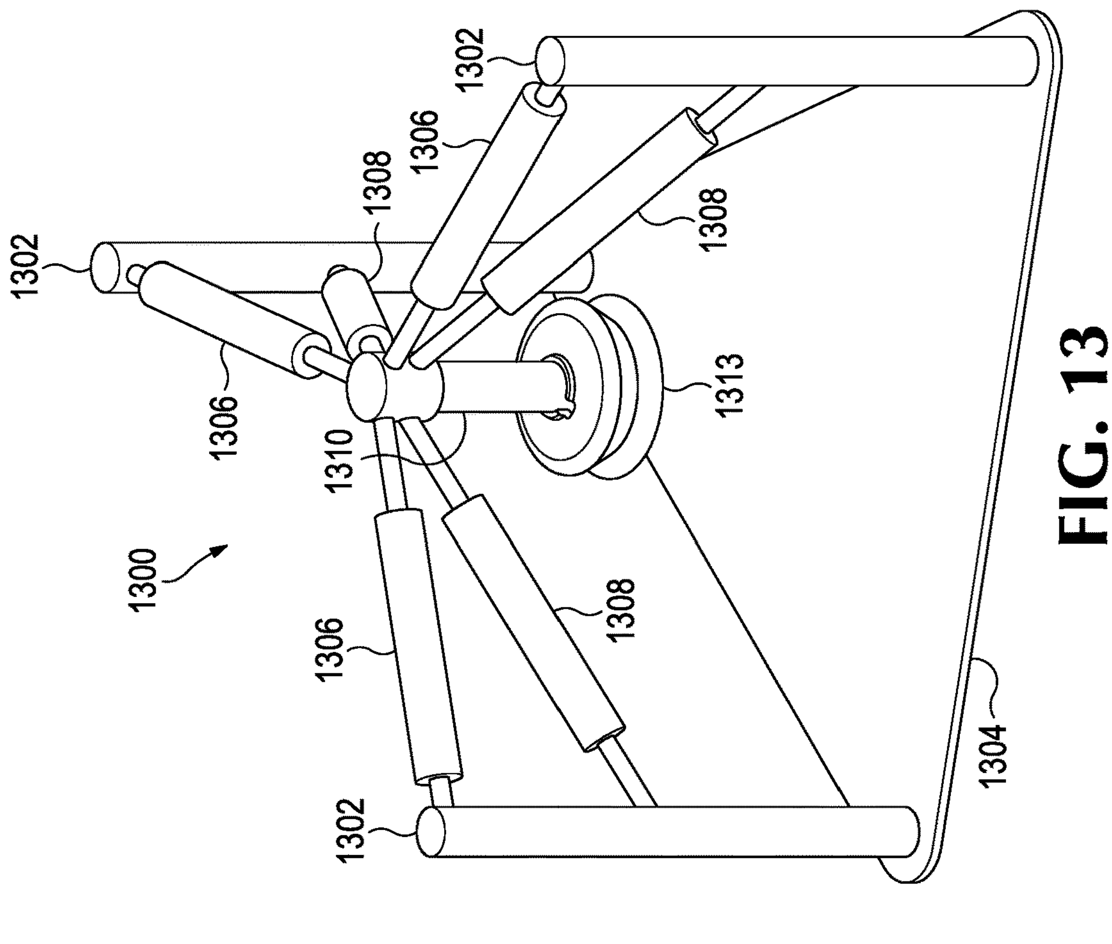
FIG. 13 is a perspective view of another example of a mechanical compression device for adjusting a compression position according to some examples of the disclosure.
Figure 14:
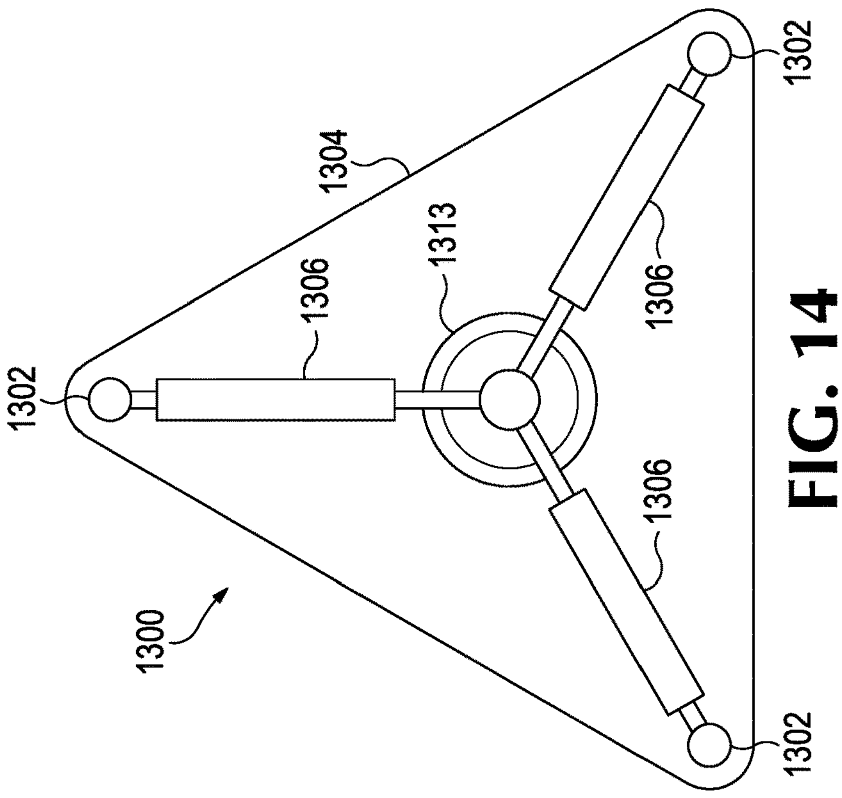
FIG. 14 is a bottom view of the mechanical chest compression device of FIG. 13.

FIG. 13 illustrates a perspective view of another example of a mechanical compression device 1300 that can adjust the point of compression, either manually or automatically. FIG. 14 illustrates a bottom view of the mechanical compression device 1300. The mechanical compression device 1300 illustrated in FIG. 13 includes three stands 1302 extending from a base plate 1304. While three stands 1302 are illustrated in FIG. 13, examples of the disclosure are not limited to three stands 1302 and more than three stands 1302 may be used.

Each stand 1302 is connected to two actuators 1306 and 1308. The actuators 1306 and 1308 can be any type of actuator, such as, but not limited to, hydraulic, electrical, pneumatic, magnetic, etc. The actuator 1306 is attached or coupled to an end of the stand 1302 furthest from the back plate 1304. The actuator 1308 is connected to the stand 1302 closer to the back plate 1304. In some examples, the actuator 1308 is connected to the stand 1302 at approximately the middle of the stand 1302. However, other attachment locations may be used on the stands 1302.

Similar to examples discussed above, the components illustrated in FIG. 2 can be included in the mechanical compression device 1300. For example, the controller 204 can control the actuators 1306 and 1308 to both adjust the position of the compression point as well as to provide the compressions. One or more sensors 220 can transmit information to the controller 204 about the physiological parameters of the patient, as discussed above and may be used to determine the compression position.

Each of the actuators 1306 and 1308 attach to a compression member 1310, which has an attached compression pad or suction cup 1313. Each of the actuators 1306 can be adjusted to change the compression point position, as best illustrated in FIG. 13. In FIG. 13, actuators 1306 can be driven by the controller 204 to select the positioning of the pressure pad. The controller 204 can adjust the actuators 1306 to adjust the compression pad or suction cup 1313 at the desired location within a plane that is parallel to the back plate 1304 either based on a user input through the user interface 218 or based on feedback from the one or more sensors 220, as discussed extensively above.

After the compression position has been set using actuators 1306, actuators 1308 can be driven by the controller 204 to compress the chest or abdomen of the patient. The actuators 1308 are driven in concert to cause the compression member 1310 to provide the compressions to the chest of patient.

In some examples, the actuators 1308 can also be engaged or driven to set the compression position. For example, for smaller patients, the compression position may be need to be set lower and a starting point for the compressions may be set using the actuators 1308. Compressions may then be performed from the starting position. The controller 204 can cause the actuators 1308 to start from the starting position and perform a compression and then return to the starting position.

Additionally or alternatively, attachment point of the actuators 1306 and 1308 to the stands 1302 may be adjustable. For example, actuators 1306 and 1308 may be moved up or down relative to the back plate 1304 to move the compression member 1310 closer or further from the patient. This may be done, for example, by having a clamping member that can clamp the actuators 1306 and 1308 to the stands 1302 at the desired positions. The actuators 1306 and 1308 may move in tandem along the stand 1302 or in other examples, the actuators 1306 and 1308 may move independently along the stand 1302.

Additionally or alternatively, the actuators 1306 and 1308 of each stand 1302 may be set at different heights along the stands 1302 relative to the other stands 1302. For example, the actuators 1306 and 1308 of one stand 1302 may be in lower positions than the actuators 1306 and 1308 attached to the other stands 102. Having different heights for the actuators 1306 and 1308 in one or more of the stands 1302 can allow the mechanical compression device 1300 to provide compressions at an angle, similar to some of the examples of the mechanical compression device 500 discussed above. Additionally or alternatively, each stand 1302 itself may be any type of actuator, such as, but not limited to, hydraulic, electrical, pneumatic, magnetic, etc.

Additionally or alternatively, small adjustments to the position of the piston may be accomplished by allowing the position of the suction cup or other interface to be fine-tuned relative to the position of the piston. Configurations illustrating examples this fine-tuning feature are shown in FIGS. 15-29, which are more fully described below. Common to each of the illustrated configurations is that the feature allows the centerline of the suction cup or other interface to be offset from the centerline of the piston, without uncoupling the piston from the suction cup or other interface. While the amount of adjustment (measured by the offset of the centerlines) may vary with the application, the fine-tuning adjustment is preferably 25 millimeters or less and, more preferably about 15 millimeters or less, and even more preferably about 10 millimeters or less.

While the discussion of FIGS. 15-29 use some of the reference numbers from the configuration of FIG. 1, the features described for FIGS. 15-29 can be included with any of the configurations illustrated in FIGS. 1-14 or that are otherwise discussed in this disclosure.

Figure 15:
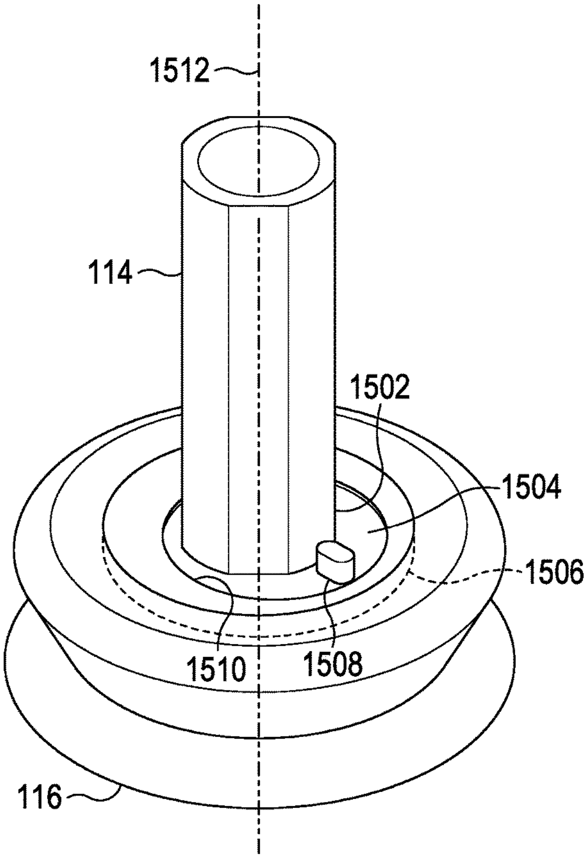
FIG. 15 is a perspective view of a portion of a piston and a suction cup in a first configuration, according to examples of the disclosure.
Figure 17:
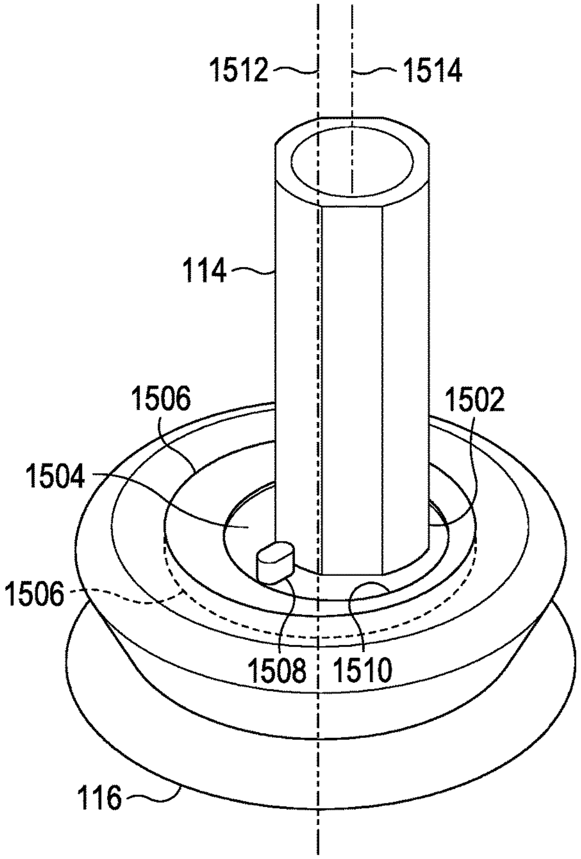
FIG. 17 is a perspective view of a portion of the piston and the suction cup of FIG. 15 in a second configuration, according to examples of the disclosure.
Figure 16:
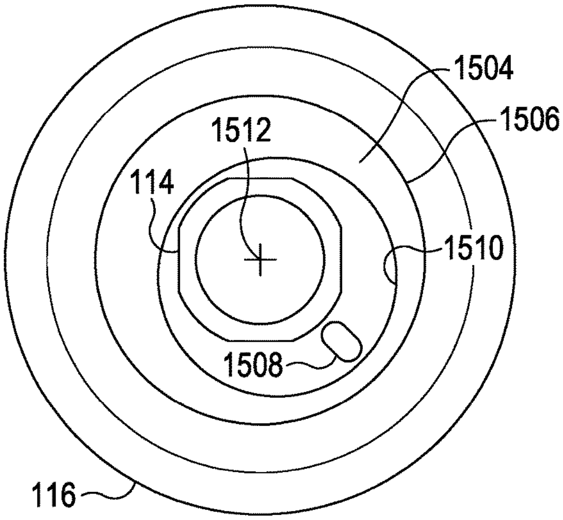
FIG. 16 is a top view of the piston and the suction cup of FIG. 15.
Figure 18:
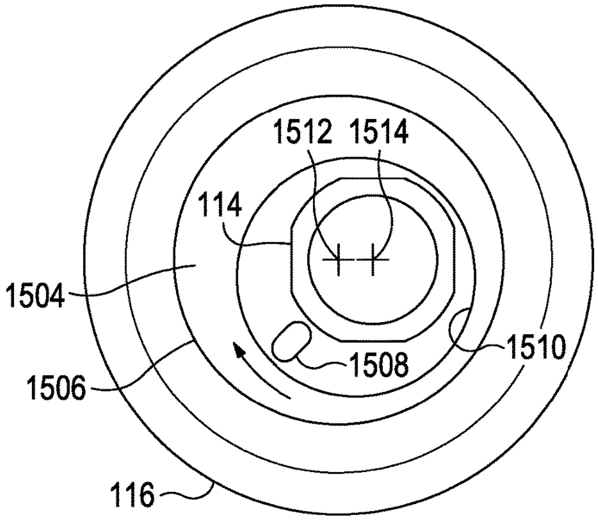
FIG. 18 is a top view of the piston and the suction cup of FIG. 17.

FIG. 15 is a perspective view of a portion of a piston and a suction cup in a first configuration, according to examples of the disclosure. FIG. 16 is a top view of the piston and the suction cup of FIG. 15. FIG. 17 is a perspective view of a portion of the piston and the suction cup of FIG. 15 in a second configuration, according to examples of the disclosure. FIG. 18 is a top view of the piston and the suction cup of FIG. 17.

As illustrated in FIGS. 15-18, an end 1502 the motor-driven piston 114 includes or is coupled to a disk 1504 configured to rotate relative to a carrier 1506. The carrier 1506 is configured to retain the disk 1504 and to permit the disk 1504 to rotate relative to the carrier 1506. In configurations, there may be a friction fit between the disk 1504 and the carrier 1506 to minimize undesired rotation of the disk 1504 within the carrier 1506. The carrier 1506 is affixed to the suction cup 116 or other interface. As illustrated, the end 1502 of the motor-driven piston 114 is not centered on the disk 1504. As illustrated, the plate may include an adjustment knob 1508 to facilitate rotating the disk 1504 within the carrier 1506.

As best illustrated by the broken lines in FIGS. 16 and 18, the disk 1504 may have a diameter larger than a diameter of an opening 1510 in the carrier 1506 so that the disk 1504 may rotate relative to the carrier 1506 without coming out through the opening 1510 in the carrier 1506.

Accordingly, the disk 1504 may be rotated relative to the carrier 1506 such that a vertical centerline 1512 of the suction cup 116 or other interface is substantially coextensive with a longitudinal centerline 1514 of the motor-driven piston 114. As used in this context, "substantially coextensive" means largely or essentially coinciding in space, without requiring perfect coincidence. An example of this is shown in FIGS. 15 and 16.

In addition, the disk 1504 may be rotated relative to the carrier 1506 such that the centerline 1512 of the suction cup 116 or other interface is substantially offset from and parallel to the centerline 1514 of the motor-driven piston 114. As used in this context, "substantially offset from and parallel to" means that the centerlines are not substantially coextensive but are largely or essentially equidistant at all points, without requiring perfect parallelism. An example of this is shown in FIGS. 17 and 18.

Accordingly, by rotating the disk 1504 within the carrier 1506, the position of the suction cup 116 or other interface may be fine-tuned.

Figure 21:
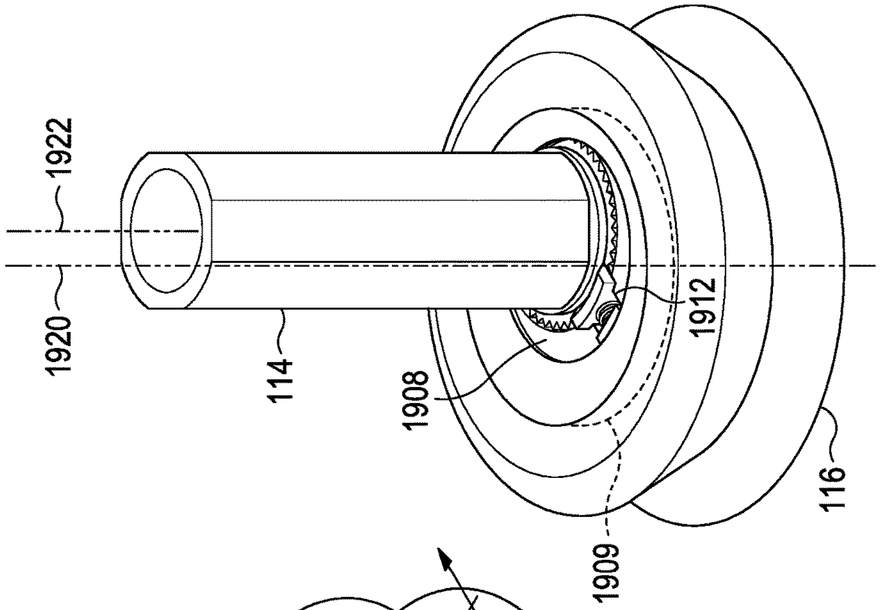
FIG. 21 is an unexploded, perspective view of a portion of the piston and the suction cup of FIG. 19 in a second configuration, according to examples of the disclosure.
Figure 20:
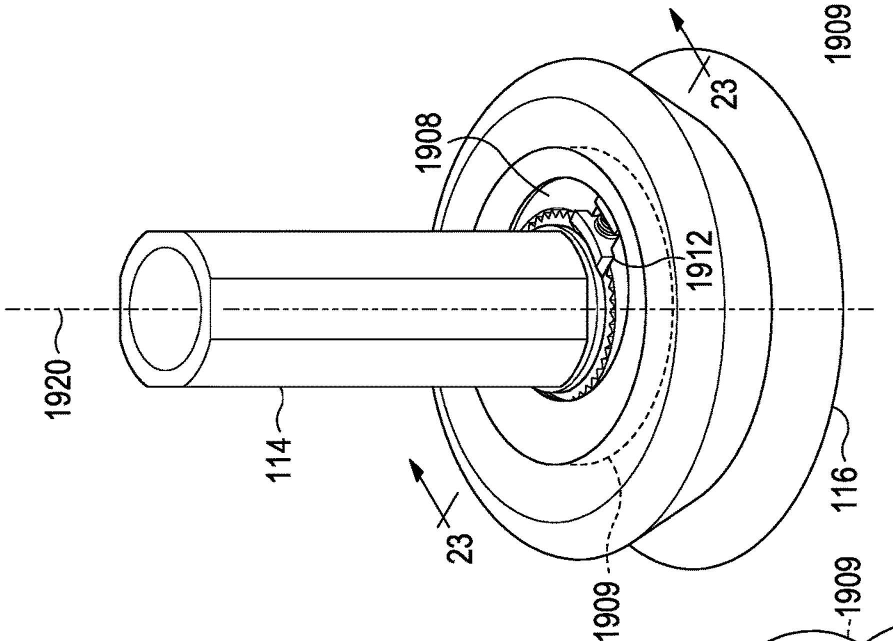
FIG. 20 is an unexploded, perspective view of a portion of the piston and the suction cup of FIG. 19 in a first configuration, according to examples of the disclosure.
Figure 19:
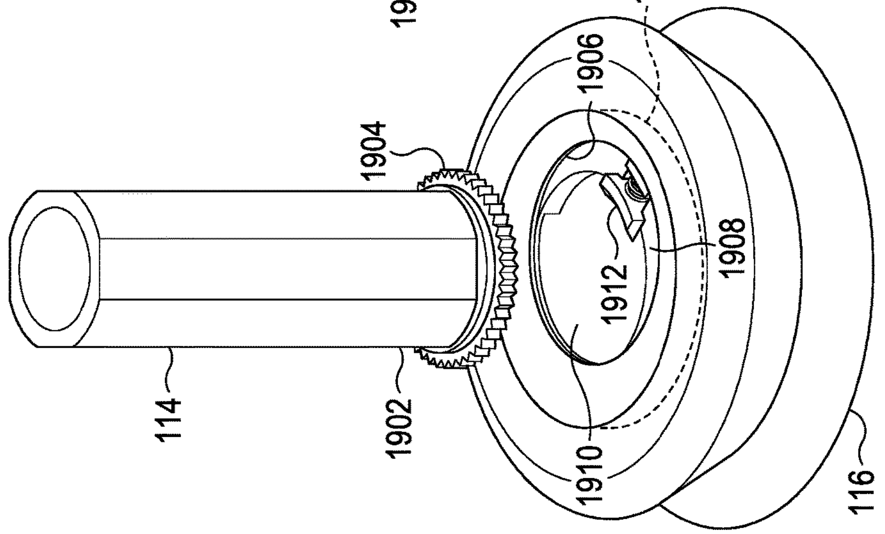
FIG. 19 is a partially exploded, perspective view of a portion of a piston and a suction cup, according to examples of the disclosure.
Figure 22:
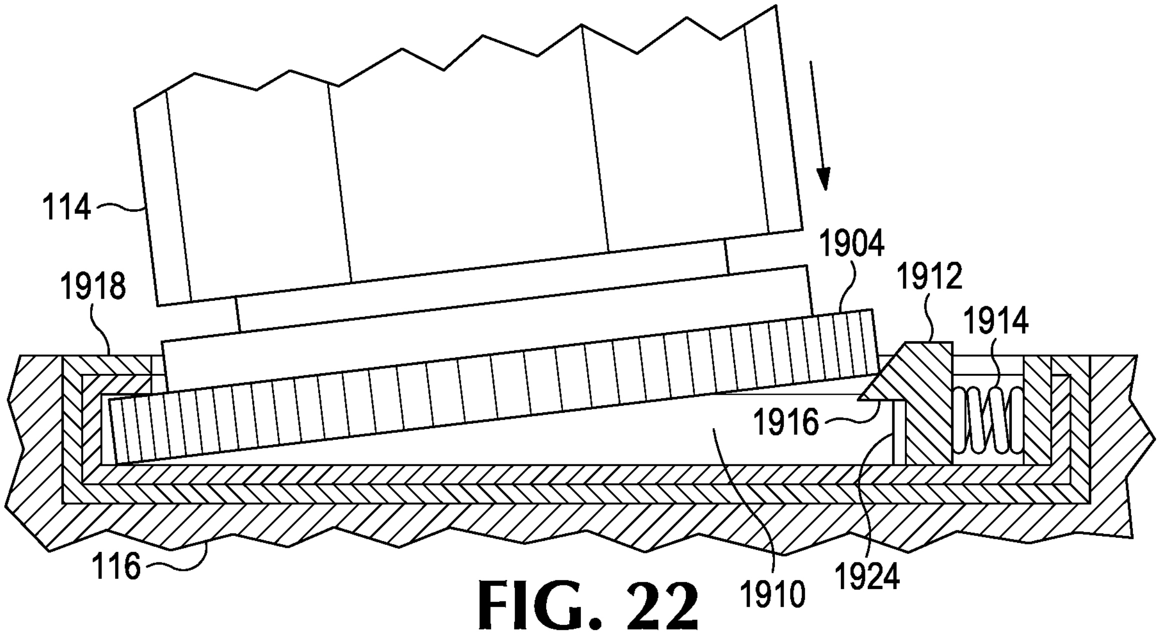
FIG. 22 is a detailed view as defined in FIG. 20, but showing the piston partially uncoupled from the suction cup, according to examples of the disclosure.
Figure 23:
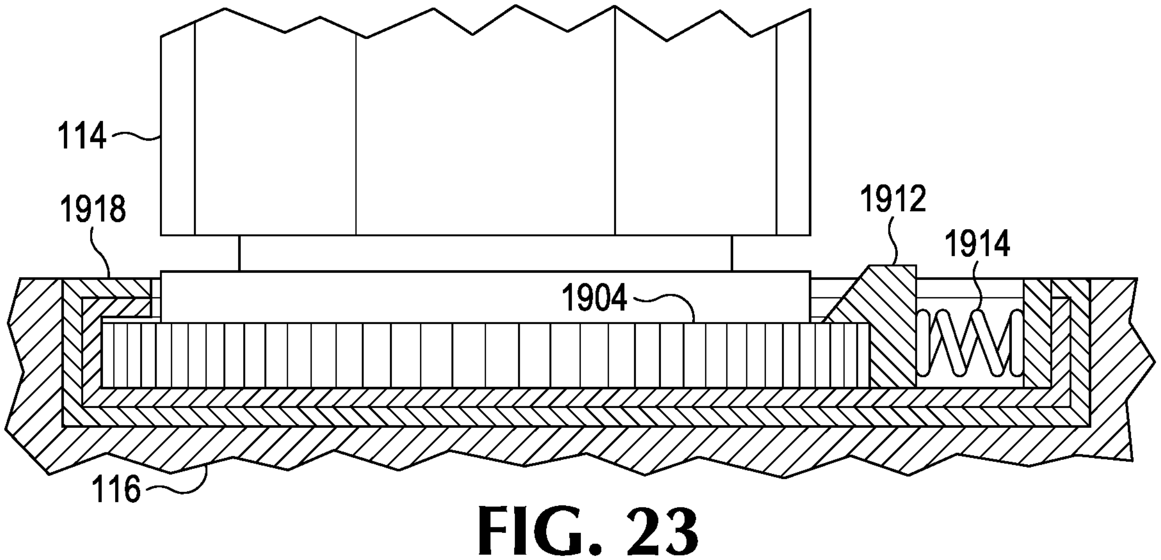
FIG. 23 is a detailed view as defined in FIG. 20.

FIG. 19 is a partially exploded, perspective view of a portion of a piston and a suction cup, according to examples of the disclosure. FIG. 20 is an unexploded, perspective view of a portion of the piston and the suction cup of FIG. 19 in a first configuration, according to examples of the disclosure. FIG. 21 is an unexploded, perspective view of a portion of the piston and the suction cup of FIG. 19 in a second configuration, according to examples of the disclosure. FIG. 22 is a detailed view as defined in FIG. 20, but showing the piston partially uncoupled from the suction cup, according to examples of the disclosure. FIG. 23 is a detailed view as defined in FIG. 20.

As illustrated in FIGS. 19-23, an end 1902 of the motor-driven piston 114 includes a toothed ring 1904 or other engagement surface configured to fit within an opening 1906 of a disk 1908 and be secured within a chamber 1910 of the disk 1908 that is accessible through the opening 1906. The disk 1908 is configured to rotate relative to a carrier 1909. The carrier 1909 is configured to retain the disk 1908 and to permit the disk 1908 to rotate relative to the carrier 1909. In configurations, there may be a friction fit between the disk 1908 and the carrier 1909 to minimize undesired rotation of the disk 1908 within the carrier 1909. The carrier 1909 is affixed to the suction cup 116 or other interface. As illustrated, the end 1902 of the motor-driven piston 114 is not centered on the disk 1908. As illustrated, in configurations the carrier 1909 may be integrated with the suction cup 116 or other interface.

As illustrated the disk 1908 may include a button 1912 to facilitate securing the end 1902 of the motor-driven piston 114 within the disk 1908. The button 1912 may include a spring 1914 to bias the button 1912 toward the toothed ring 1904. In configurations, the button 1912 may include a projection, or tooth, 1924 configured to engage the toothed ring 1904. When engaged, the projection 1924 helps to prevent rotation of the toothed ring 1904 (and, hence, the motor-driven piston 114) within the chamber 1910 of the disk 1908. In configurations, the button 1912 may also or instead facilitate rotating the disk 1908 within the carrier 1909.

The button 1912 may include a lip or ridge 1916 configured to overhang the toothed ring 1904 when the end 1902 of the motor-driven piston 114 is within the opening 1906 of the disk 1908. The lip or ridge 1916 may help to secure the toothed ring 1904 (and, hence, the end 1902 of the motor-driven piston 114) within the disk 1908. As illustrated, the disk 1908 may include a lip or ridge 1918 configured to overhang the toothed ring 1904 when the end 1902 of the motor-driven piston 114 is within the opening 1906 of the disk 1908. The lip or ridge 1918 may help to secure the toothed ring 1904 (and, hence, the end 1902 of the motor-driven piston 114) within the disk 1908.

Accordingly, the disk 1908 may be rotated relative to the carrier 1909 such that a centerline 1920 of the suction cup 116 or other interface is substantially coextensive with a longitudinal centerline 1922 of the motor-driven piston 114. An example of this is shown in FIG. 20.

In addition, the disk 1908 may be rotated relative to the carrier 1909 such that the centerline 1920 of the suction cup 116 or other interface is substantially offset from and parallel to the centerline 1922 of the motor-driven piston 114. An example of this is shown in FIG. 21.

Accordingly, by rotating the disk 1908 within the carrier 1909, the position of the suction cup 116 or other interface may be fine-tuned.

Figure 24:
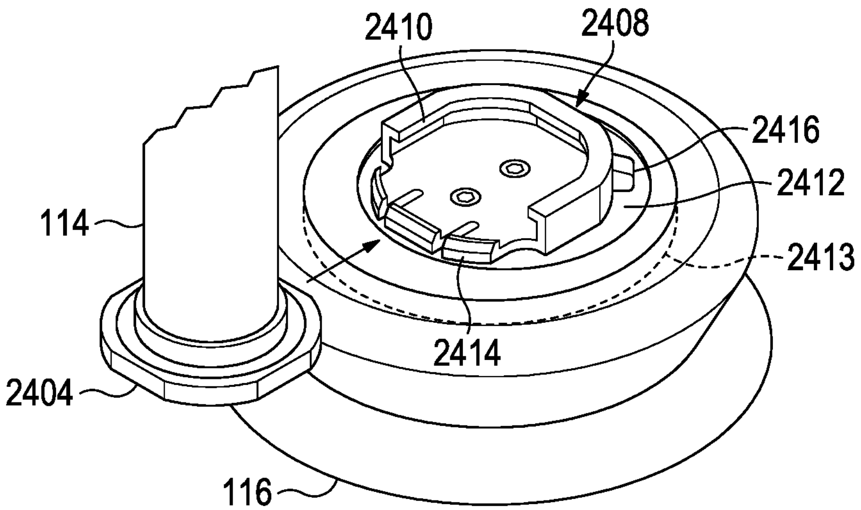
FIG. 24 is a partially exploded, perspective view of a portion of a piston and a suction cup, according to examples of the disclosure.
Figure 26:
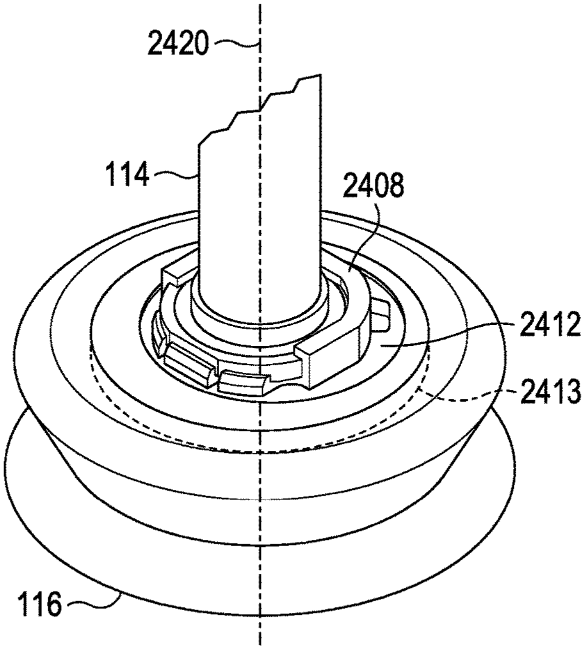
FIG. 26 is an unexploded, perspective view of a portion of the piston and the suction cup of FIG. 24 in a first configuration, according to examples of the disclosure.
Figure 27:
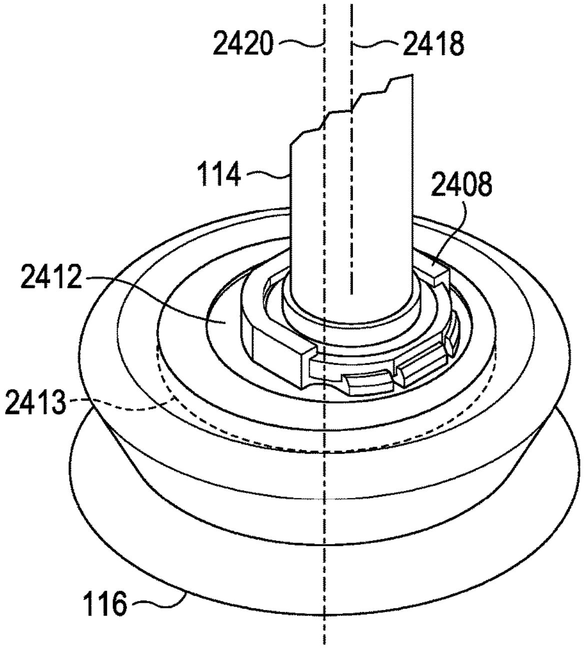
FIG. 27 is an unexploded, perspective view of a portion of the piston and the suction cup of FIG. 24 in a second configuration, according to examples of the disclosure.

FIG. 24 is a partially exploded, perspective view of a portion of a piston and a suction cup, according to examples of the disclosure. FIG. 26 is an unexploded, perspective view of a portion of the piston and the suction cup of FIG. 24 in a first configuration, according to examples of the disclosure. FIG. 27 is an unexploded, perspective view of a portion of the piston and the suction cup of FIG. 24 in a second configuration, according to examples of the disclosure.

As illustrated in FIGS. 24, 26 and 27, an end 2404 of the motor-driven piston 114 couples to a bracket 2408. For example, the plate 2402 may slide under a lip or edge 2410 of the bracket 2408 to secure the plate 2402 within the bracket 2408. The bracket 2408 may include one or more tabs 2414 configured to secure the end 2404 of the motor-driven piston 114 under the lip or edge 2410 of the bracket 2408. In configurations, the bracket 2408 or the disk 2412 may include an adjustment knob 2416 to assist in removing the end 2404 of the motor-driven piston 114 from the bracket 2408 by, for example, mechanically pushing the end 2404 out from under the lip or edge 2410 of the bracket 2408. In configurations, the adjustment knob 2416 may also or instead facilitate rotating the disk 2412 within the carrier 2413.

The bracket 2408 is coupled to a disk 2412. The disk 2412 is configured to rotate relative to a carrier 2413. The carrier 2413 is configured to retain the disk 2412 and to permit the disk 2412 to rotate relative to the carrier 2413. In configurations, there may be a friction fit between the disk 2412 and the carrier 2413 to minimize undesired rotation of the disk 2412 within the carrier 2413. The carrier 2413 is affixed to the suction cup 116 or other interface. As illustrated, the end 2404 of the motor-driven piston 114 is not centered on the disk 2412.

Accordingly, the disk 2412 may be rotated relative to the carrier 2413 such that a centerline 2418 of the suction cup 116 or other interface is substantially coextensive with a centerline 2420 of the motor-driven piston 114. An example of this is shown in FIG. 26.

In addition, the disk 2412 may be rotated relative to the carrier 2413 such that the centerline 2418 of the suction cup 116 or other interface is substantially offset from and parallel to the centerline 2420 of the motor-driven piston 114. An example of this is shown in FIG. 27.

Accordingly, by rotating the disk 2412 within the carrier 2413, the position of the suction cup 116 or other interface may be fine-tuned.

Figure 25:
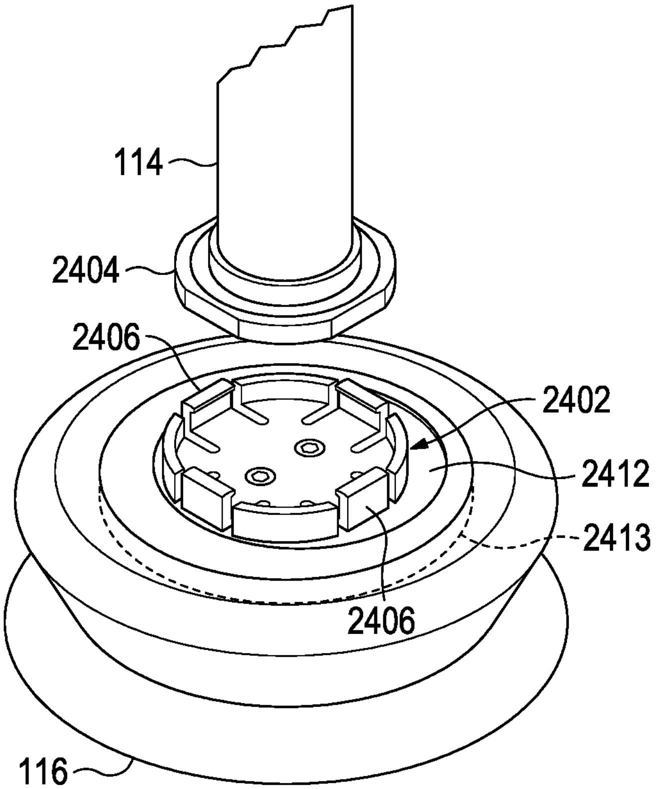
FIG. 25 is a partially exploded, perspective view of a portion of a piston and a suction cup, according to examples of the disclosure.
Figure 28:
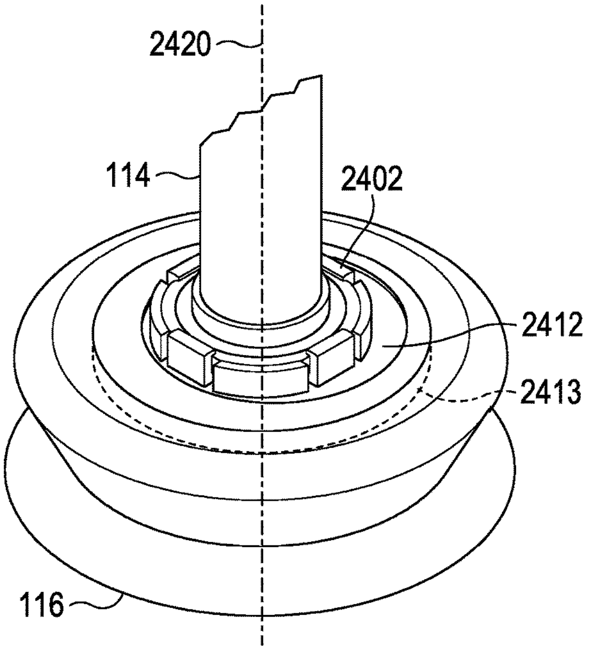
FIG. 28 is an unexploded, perspective view of a portion of the piston and the suction cup of FIG. 25 in a first configuration, according to examples of the disclosure.
Figure 29:
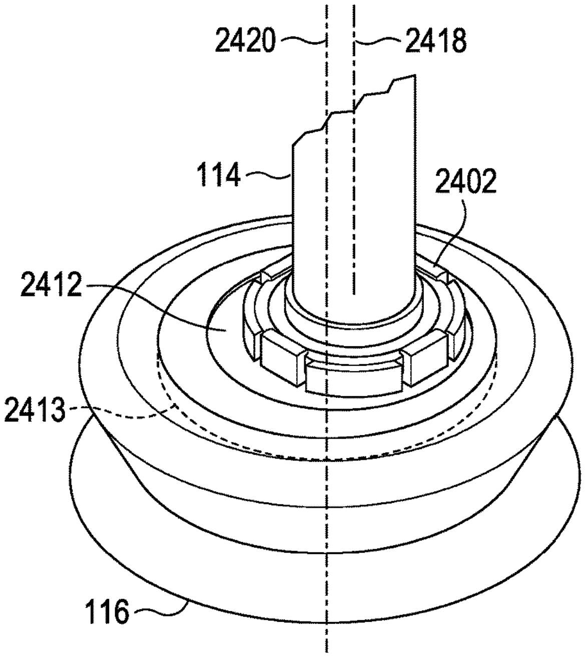
FIG. 29 is an unexploded, perspective view of a portion of the piston and the suction cup of FIG. 25 in a second configuration, according to examples of the disclosure.

FIG. 25 is a partially exploded, perspective view of a portion of a piston and a suction cup, according to examples of the disclosure. FIG. 28 is an unexploded, perspective view of a portion of the piston and the suction cup of FIG. 25 in a first configuration, according to examples of the disclosure. FIG. 29 is an unexploded, perspective view of a portion of the piston and the suction cup of FIG. 25 in a second configuration, according to examples of the disclosure.

As illustrated in FIGS. 25, 28 and 29, a plate 2402 may couple to an end 2404 of the motor-driven piston 114, for example, through a snap fit or other interference fit between the plate 2402 and the end 2404. Accordingly, the plate 2402 may include one or more tabs 2406 configured to collectively or individually grasp the end 2404 of the motor-driven piston 114. The plate 2402 is configured to couple to the disk 2412. The disk 2412 is configured to rotate relative to a carrier 2413. The carrier 2413 is configured to retain the disk 2412 and to permit the disk 2412 to rotate relative to the carrier 2413. In configurations, there may be a friction fit between the disk 2412 and the carrier 2413 to minimize undesired rotation of the disk 2412 within the carrier 2413. The carrier 2413 is affixed to the suction cup 116 or other interface. As illustrated, the end 2404 of the motor-driven piston 114 is not centered on the disk 2412.

Figure 30:
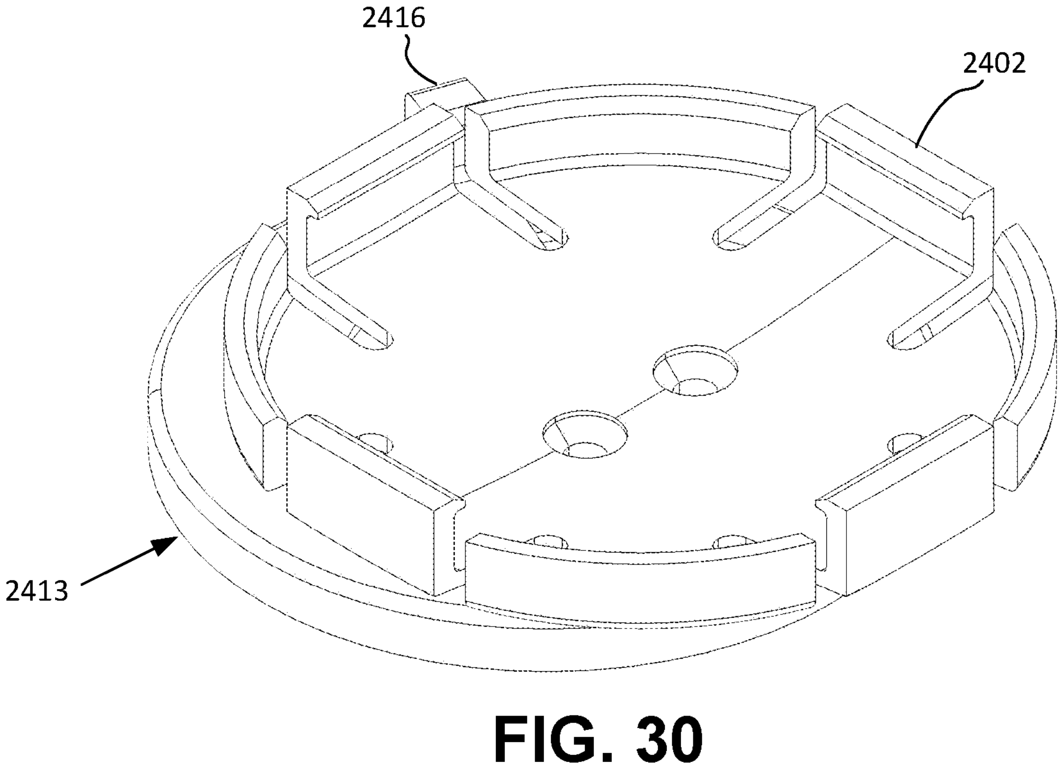
FIG. 30 is an upper perspective view of an example fine-tuning adjustment mechanism, according to examples of the disclosure.
Figure 31:
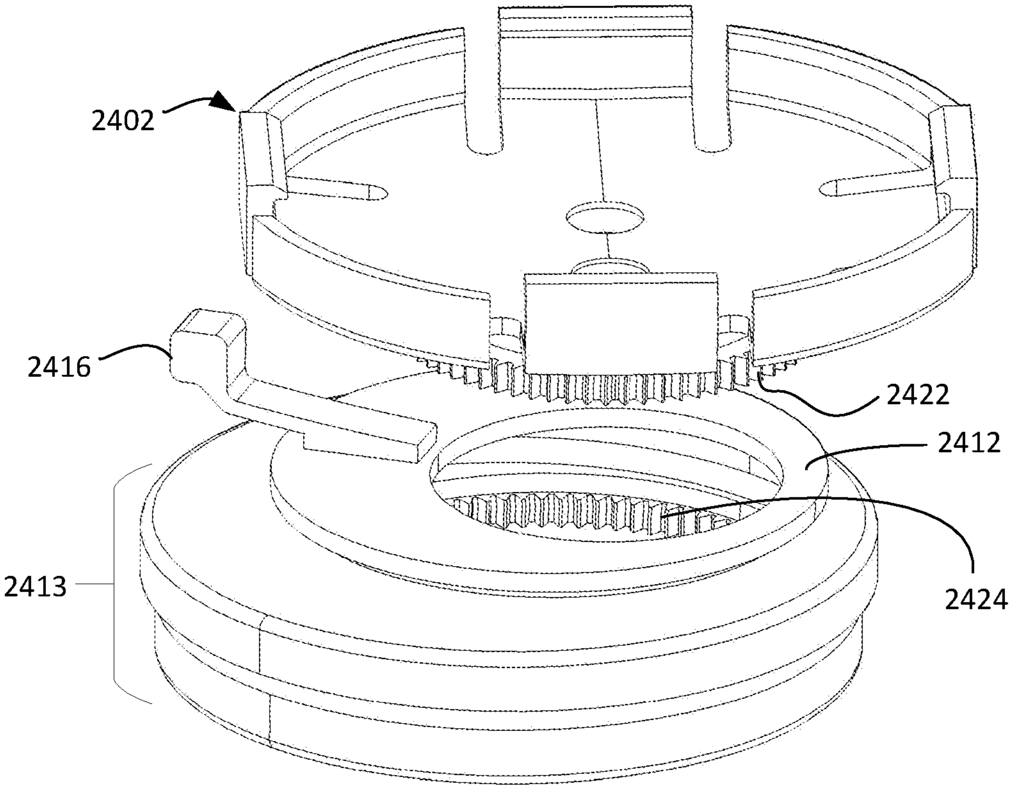
FIG. 31 is an exploded view of the example fine-tuning adjustment mechanism of FIG. 30.
Figure 32:
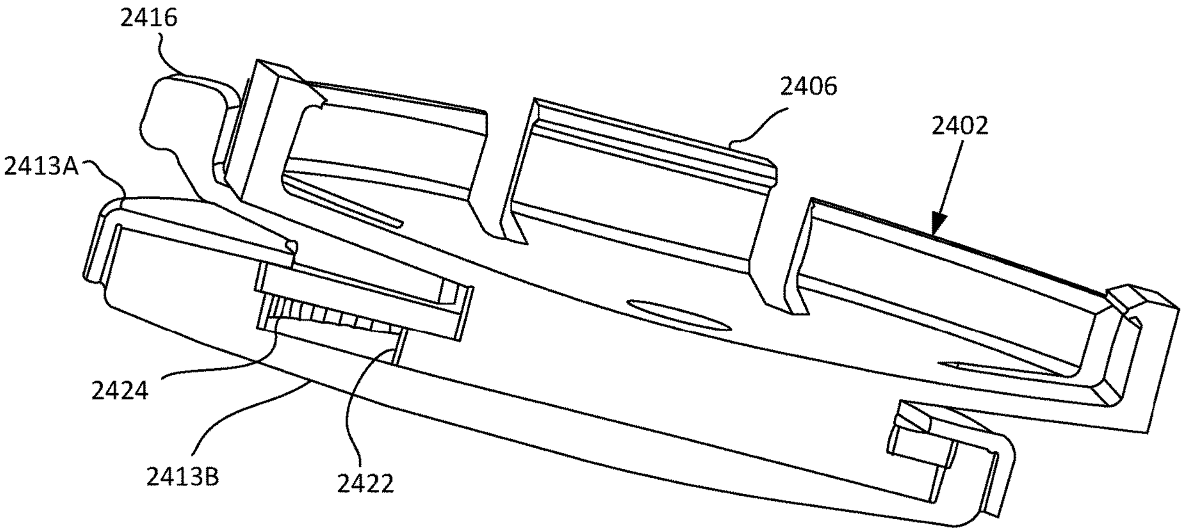
FIG. 32 is a sectional of a lower perspective view of the example fine-tuning adjustment mechanism of FIG. 30.

The configuration illustrated in FIGS. 25, 28 and 29 may also include the adjustment knob 2416, and an example of this is shown in FIGS. 30-32.

Accordingly, the disk 2412 may be rotated relative to the carrier 2413 such that a centerline 2418 of the suction cup 116 or other interface is substantially coextensive with a centerline 2420 of the motor-driven piston 114. An example of this is shown in FIG. 28.

In addition, the disk 2412 may be rotated relative to the carrier 2413 such that the centerline 2418 of the suction cup 116 or other interface is substantially offset from and parallel to the centerline 2420 of the motor-driven piston 114. An example of this is shown in FIG. 29.

Accordingly, by rotating the disk 2412 within the carrier 2413, the position of the suction cup 116 or other interface may be fine-tuned.

Figure 33:
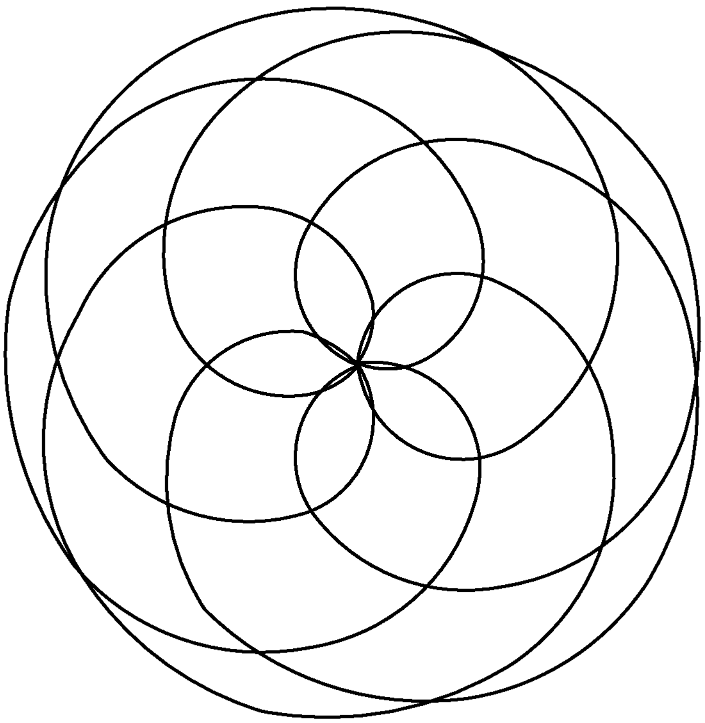
FIG. 33 illustrates an example pattern the centerline of the suction cup or other interface may trace when using the example fine-tuning adjustment mechanism of FIG. 30.

FIG. 30 is an upper perspective view of an example fine-tuning adjustment mechanism, according to examples of the disclosure. FIG. 31 is an exploded view of the example fine-tuning adjustment mechanism of FIG. 30. FIG. 32 is a sectional of a lower perspective view of the example fine-tuning adjustment mechanism of FIG. 30. FIG. 33 illustrates an example pattern the centerline of the suction cup or other interface may trace when using the example fine-tuning adjustment mechanism of FIG. 30.

In addition to what is described above for FIGS. 15-29, FIGS. 30-32 illustrate an example configuration of how the plate 2402, the disk 2412, and the carrier 2413 may operate to allow the centerline 2420 of the suction cup 116 or other interface to be offset from the centerline 2418 of the piston 114, without uncoupling the piston 114 from the suction cup 116 or other interface. While the discussion of FIGS. 30-32 uses the reference numbers and images from the configuration shown in FIGS. 25,28, and 29, the principles may be applied to each of the configurations illustrated in FIGS. 15-29.

Specifically, the feature illustrated in FIGS. 30-32 utilizes a wheel 2422 that is constrained to roll around an inner diameter 2424 of the carrier 2413. The axis of the wheel 2422 is coextensive with the centerline 2418 of the piston 114 when the piston 114 is coupled to the plate 2402. The axis of the inner diameter 2424 is coextensive with the centerline 2420 of the suction cup 116 or other interface. Accordingly, the centerline 2418 of the suction cup 116 or other interface may trace a pattern similar to what is illustrated in FIG. 33. The pattern illustrated in FIG. 33 is just one example pattern. The actual pattern would depend, for example, on the diameter of the wheel 2422, the diameter of the inner diameter 2424 of the carrier 2413, and the number of teeth on each (for configurations having gear teeth as noted below).

In configurations, the wheel 2422 and the inner diameter 2424 of the carrier 2413 may include gear teeth, such as is illustrated, to enmesh and assist the wheel 2422 to smoothly roll around the inner diameter 2424 of the carrier 2413 without slipping. (An example of the wheel 2422 with gear teeth is the toothed ring 1904 illustrated in FIGS. 19-23.) In configurations, the wheel 2422 and the inner diameter 2424 of the carrier 2413 may include facets to assist the wheel 2422 to roll around the inner diameter 2424 of the carrier 2413 without slipping. In configurations, one or both of the wheel 2422 and the inner diameter 2424 of the carrier 2413 may include an elastomer, such as an O-ring, to provide friction and assist the wheel 2422 to roll around the inner diameter 2424 of the carrier 2413 without slipping. The carrier 2413 may comprise an upper piece 2413A and a lower piece 2413B that may be separated for easier assembly.

For purposes of this description, certain aspects, advantages, and novel features of the examples of this disclosure are described herein. Features, integers, characteristics, compounds, chemical moieties or groups described in conjunction with a particular aspect, configuration, or example of the disclosure are to be understood to be applicable to any other aspect, configuration or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. "Generally" or "approximately" as used herein means a variance of 10%.

As used herein, the term "and/or" used between the last two of a list of elements means any one or more of the listed elements. For example, the phrase "A, B, and/or C" means "A," "B," "C," "A and B," "A and C," "B and C," or "A, B, and C."

As used herein, the term "coupled" generally means physically coupled or linked and does not exclude the presence of intermediate elements between the coupled items absent specific contrary language.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure.

Aspects may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various configurations. In addition, the functionality may be embodied in whole or in part in firmware or hardware equivalents such as integrated circuits, field programmable gate arrays (FPGA), and the like. Particular data structures may be used to more effectively implement one or more aspects of the disclosed systems and methods, and such data structures are contemplated within the scope of computer executable instructions and computer-usable data described herein.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the described apparatus may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A mechanical compression device, comprising:

a back plate; and a support frame attached to the back plate, the support frame including:

a first support column having a first actuator, a second support column having a second actuator, and one or more drivers configured to drive the first actuator of the first support column and the second actuator of the second support column, and a compression beam attached to the first actuator and the second actuator of each of the first support column and the second support column, the compression beam having a compression member, wherein the first support column is laterally tiltable relative to the back plate when the first support column is attached to the back plate and to the compression beam, and wherein the second support column is laterally tiltable relative to the back plate when the second support column is attached to the back plate and to the compression beam; and a processor configured to:

set a starting position of the compression beam by independently adjusting a start position of the first actuator and the second actuator, and drive the compression beam to provide compressions to a patient from the respective starting position of each of the first actuator and the second actuator.

2. The mechanical compression device of claim 1, wherein the start position of the first actuator and the start position of the second actuator are not symmetrical.

3. The mechanical compression device of claim 2, wherein the compression beam is driven to provide a compression to the patient at an angle.

4. The mechanical compression device of claim 2, wherein the start position of the first actuator and the start position of the second actuator are set such that a centerline of the compression member is offset from a centerline of the mechanical compression device.

5. The mechanical compression device of claim 1, wherein the first support column and the second support column are tiltable relative to the back plate.

6. The mechanical compression device of claim 5, wherein the first support column and the second support column each include a second actuator configured to tilt the first support column and the second support column.

7. The mechanical compression device of claim 1, wherein the compression member is laterally slidable relative to the compression beam.

8. The mechanical compression device of claim 1, wherein the compression member includes a joint between a piston and a suction cup.

9. A mechanical compression device, comprising:

a back plate; and a support frame attached to the back plate, the support frame including:

a first support column having a first actuator, a second support column having a second actuator, one or more drivers configured to drive the first actuator of the first support column and the second actuator of the second support column, and the first support column and the second support column each including another actuator configured to tilt the respective first support column or the second support column relative to the back plate, and a compression beam attached to the first actuator and the second actuator of each of the first support column and the second support column, the compression beam having a compression member; and a processor configured to:

set a starting position of the compression beam by independently adjusting a start position of the first actuator and the second actuator, and drive the compression beam to provide compressions to a patient from the respective starting position of each of the first actuator and the second actuator.

10. The mechanical compression device of claim 9, wherein the start position of the first actuator and the start position of the second actuator are not symmetrical.

11. The mechanical compression device of claim 10, wherein the compression beam is driven to provide a compression to the patient at an angle.

12. The mechanical compression device of claim 10, wherein the start position of the first actuator and the start position of the second actuator are set such that a centerline of the compression member is offset from a centerline of the mechanical compression device.

13. The mechanical compression device of claim 9, wherein the compression member is laterally slidable relative to the compression beam.

14. The mechanical compression device of claim 9, wherein the compression member includes a joint between a piston and a suction cup.

15. A mechanical compression device, comprising:

a back plate; and a support frame attached to the back plate, the support frame including:

a first support column having a first actuator, a second support column having a second actuator, and one or more drivers configured to drive the first actuator of the first support column and the second actuator of the second support column, and a compression beam attached to the first actuator and the second actuator of each of the first support column and the second support column, the compression beam having a compression member; and a processor configured to:

set a starting position of the compression beam by independently adjusting a start position of the first actuator away from the back plate and a start position of the second actuator away from the back plate, wherein the start position of the first actuator and the start position of the second actuator are not symmetrical, and drive the compression beam to provide compressions to a patient from the respective starting position of each of the first actuator and the second actuator.

16. The mechanical compression device of claim 15, wherein the compression beam is driven to provide a compression to the patient at an angle.

17. The mechanical compression device of claim 15, wherein the start position of the first actuator and the start position of the second actuator are set such that a centerline of the compression member is offset from a centerline of the mechanical compression device.

18. The mechanical compression device of claim 15, wherein the first support column and the second support column are tiltable relative to the back plate.

19. The mechanical compression device of claim 15, wherein the first support column and the second support column each include another actuator configured to tilt the respective first support column or the second support column relative to the back plate.

20. The mechanical compression device of claim 15, wherein the compression member is laterally slidable relative to the compression beam.

* * * * *